United States Patent
Buchmueller et al.

(10) Patent No.: US 10,822,081 B2
(45) Date of Patent: Nov. 3, 2020

(54) COMMUNICATIONS AND LANDINGS OF UNMANNED AERIAL VEHICLES ON TRANSPORTATION VEHICLES FOR TRANSPORT

(71) Applicant: Amazon Technologies, Inc., Seattle, WA (US)

(72) Inventors: Daniel Buchmueller, Seattle, WA (US); Scott A. Green, North Bend, WA (US); Atishkumar Kalyan, Seattle, WA (US); Gur Kimchi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 284 days.

(21) Appl. No.: 15/785,886

(22) Filed: Oct. 17, 2017

(65) Prior Publication Data
US 2018/0037322 A1 Feb. 8, 2018

Related U.S. Application Data

(63) Continuation of application No. 14/635,743, filed on Mar. 2, 2015, now Pat. No. 9,809,305.

(51) Int. Cl.
*B64C 39/02* (2006.01)
*G01C 21/34* (2006.01)
(Continued)

(52) U.S. Cl.
CPC .......... *B64C 39/024* (2013.01); *G01C 21/343* (2013.01); *G01C 21/3423* (2013.01);
(Continued)

(58) Field of Classification Search
CPC ............ B64C 39/024; B64C 2201/128; B64C 2201/14; B64C 2201/145;
(Continued)

(56) References Cited

U.S. PATENT DOCUMENTS 5,995,898 A 11/1999 Tuttle
7,339,993 B1 3/2008 Brooks et al.
(Continued)

FOREIGN PATENT DOCUMENTS

CN 103914076 A 7/2014
CN 204095627 U 1/2015
(Continued)

OTHER PUBLICATIONS

Prakash et al.—Specification from U.S. Appl. No. 62/033,275, filed Aug. 5, 14 (Year: 2014).*
(Continued)

*Primary Examiner* — Thomas E Worden
(74) *Attorney, Agent, or Firm* — Athorus, PLLC

(57) ABSTRACT

Unmanned aerial vehicles ("UAVs") which fly to destinations (e.g., for delivering items) may land on transportation vehicles (e.g., delivery trucks, etc.) for temporary transport. An agreement with the owner of the transportation vehicles (e.g., a shipping carrier) may be made, and the associated transportation vehicles that are available for landings may be identified by markers on the roof or other identification techniques. Different types of communications may be provided as part of a landing process (e.g., a notification regarding a proposed landing may be sent including a request for a confirmation that the proposed landing is acceptable, etc.). The routes of the transportation vehicles may be known and utilized to determine locations where UAVs will land on and take off from the transportation vehicles.

21 Claims, 15 Drawing Sheets

(51) Int. Cl.
G08G 5/00 (2006.01)
G08G 5/02 (2006.01)
G06Q 10/08 (2012.01)
G06Q 10/04 (2012.01)
G06Q 50/28 (2012.01)
G06Q 50/30 (2012.01)

(52) U.S. Cl.
CPC ......... *G06Q 10/047* (2013.01); *G06Q 10/083* (2013.01); *G06Q 50/28* (2013.01); *G06Q 50/30* (2013.01); *G08G 5/0013* (2013.01); *G08G 5/0056* (2013.01); *G08G 5/0065* (2013.01); *G08G 5/0069* (2013.01); *G08G 5/025* (2013.01); *B64C 2201/128* (2013.01); *B64C 2201/14* (2013.01); *B64C 2201/145* (2013.01); *B64C 2201/165* (2013.01); *B64C 2201/18* (2013.01); *B64C 2201/20* (2013.01); *B64C 2201/208* (2013.01); *G08G 5/0039* (2013.01)

(58) Field of Classification Search
CPC .......... B64C 2201/165; B64C 2201/18; B64C 2201/20; B64C 2201/208; G01C 21/3423; G01C 21/343; G06Q 10/047; G06Q 50/28; G06Q 50/30; G08G 5/0013; G08G 5/0056; G08G 5/0065; G08G 5/0069; G08G 5/025; G08G 5/0039
See application file for complete search history.

(56) References Cited

U.S. PATENT DOCUMENTS

| | | | |
|---|---|---|---|
| 7,673,831 | B2 | 3/2010 | Steele et al. |
| 7,946,530 | B1 | 5/2011 | Talmage |
| 8,511,606 | B1 | 8/2013 | Lutke et al. |
| 9,051,043 | B1 | 6/2015 | Peeters et al. |
| 9,056,676 | B1* | 6/2015 | Wang ................ B64F 1/00 |
| 9,079,587 | B1 | 7/2015 | Rupp et al. |
| 9,244,147 | B1 | 1/2016 | Soundararajan et al. |
| 9,381,916 | B1 | 7/2016 | Zhu et al. |
| 9,704,409 | B2 | 7/2017 | Prakash et al. |
| 2002/0156645 | A1 | 10/2002 | Hansen |
| 2009/0236470 | A1 | 9/2009 | Goossen et al. |
| 2009/0314883 | A1 | 12/2009 | Arlton et al. |
| 2011/0035149 | A1 | 2/2011 | McAndrew et al. |
| 2011/0264311 | A1 | 10/2011 | Lee et al. |
| 2013/0026304 | A1 | 1/2013 | Wang |
| 2013/0081245 | A1 | 4/2013 | Vavrina et al. |
| 2014/0032034 | A1 | 1/2014 | Raptopoulos et al. |
| 2014/0136414 | A1 | 5/2014 | Abhyanker |
| 2014/0149244 | A1 | 5/2014 | Abhyanker |
| 2014/0254896 | A1 | 9/2014 | Zhou et al. |
| 2015/0006005 | A1 | 1/2015 | Yu et al. |
| 2015/0069968 | A1 | 3/2015 | Pounds |
| 2015/0102154 | A1 | 4/2015 | Duncan et al. |
| 2015/0129716 | A1 | 5/2015 | Yoffie |
| 2015/0158599 | A1 | 6/2015 | Sisko |
| 2015/0175276 | A1 | 6/2015 | Koster |
| 2015/0183528 | A1 | 7/2015 | Walsh et al. |
| 2015/0246727 | A1 | 9/2015 | Masticola et al. |
| 2015/0259078 | A1 | 9/2015 | Filipovic et al. |
| 2015/0317597 | A1 | 11/2015 | Shucker et al. |
| 2015/0332206 | A1 | 11/2015 | Trew et al. |
| 2015/0353206 | A1* | 12/2015 | Wang ................ B64F 1/00 244/114 R |
| 2015/0367850 | A1 | 12/2015 | Clarke et al. |
| 2016/0009413 | A1 | 1/2016 | Lee et al. |
| 2016/0033966 | A1 | 2/2016 | Farris et al. |
| 2016/0068267 | A1 | 3/2016 | Liu et al. |
| 2016/0144982 | A1 | 5/2016 | Sugumaran |
| 2016/0196756 | A1* | 7/2016 | Prakash ............... B64C 39/024 701/3 |
| 2016/0200438 | A1 | 7/2016 | Bokeno et al. |
| 2016/0236778 | A1 | 8/2016 | Takayama et al. |
| 2017/0139424 | A1 | 5/2017 | Li |
| 2017/0372256 | A1 | 12/2017 | Kantor et al. |

FOREIGN PATENT DOCUMENTS

| | | | |
|---|---|---|---|
| EP | 2722636 | A1 | 4/2014 |
| EP | 2727835 | A2 | 5/2014 |
| JP | 2002166895 | A | 6/2002 |
| JP | 2006051893 | A | 2/2006 |
| JP | 2011530692 | A | 12/2011 |
| JP | 2013032148 | A | 2/2013 |
| WO | 2005123502 | A2 | 12/2005 |
| WO | 2009142933 | A2 | 11/2009 |
| WO | 2015026018 | A1 | 2/2015 |

OTHER PUBLICATIONS

Wang—Specification from Parent U.S. Appl. No. 14/301,130, now U.S. Pat. No. 905,667, filed Jun. 10, 2014 (Year: 2014).*
International Search Report and Written Opinion for PCT Application No. PCT/US2016/020301 dated Aug. 16, 2016.
DHL Trend Research, "Self-Driving Vehicles in Logistics," Dec. 2014, Markus Kückelhaus et al. (downloaded from http://www.dhl.com/content/dam/downloads/g0/about_us/logistics_insights/dhl_self_driving_vehicles.pdf with an archived Web version available on https://web.archive.org/web/20151018154844/http://www.dhl.com/content/dam/downloads/g0/about_us/logistics_insights/dhl_self_driving_vehicles.pdf), 39 pages.
DHL Trend Research, "Unmanned Aerial Vehicles in Logistics: A DHL perspective on implications and use cases for the logistics industry," 2014, Markus Kückelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.
Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.
Extended European Search Report for Patent Application No. 19154613.4, dated Jun. 14, 2019.
Search Report dated Sep. 3, 2019, in corresponding CN Application No. 201680013297.2.

* cited by examiner

COMMUNICATIONS AND LANDINGS OF UNMANNED AERIAL VEHICLES ON TRANSPORTATION VEHICLES FOR TRANSPORT

PRIORITY CLAIM

This application is a continuation application of U.S. patent application Ser. No. 14/635,743, filed on Mar. 2, 2015, and entitled "Landing Of Unmanned Aerial Vehicles On Transportation Vehicles For Transport," which is incorporated herein by reference in its entirety.

BACKGROUND

Unmanned aerial vehicles are continuing to increase in use. For example, unmanned aerial vehicles are often used for surveillance. While there are many beneficial uses of unmanned aerial vehicles, they also have many drawbacks. For example, unmanned aerial vehicles are often powered by batteries, which limit flight distances according to available battery life. In some implementations, larger batteries may be utilized, although such may increase the expense of operation and add weight, which requires additional energy during flight. Similarly, any other items or features that are added to or carried by the unmanned aerial vehicles (e.g., additional equipment for the unmanned aerial vehicles, other items transported by the unmanned aerial vehicles, etc.), add weight that requires additional energy during flight and thus further limits battery life. In addition, when battery levels are low or mechanical issues arise, unmanned aerial vehicles may be forced to land in unplanned areas where damage may occur and/or which may complicate the retrieval of the unmanned aerial vehicles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
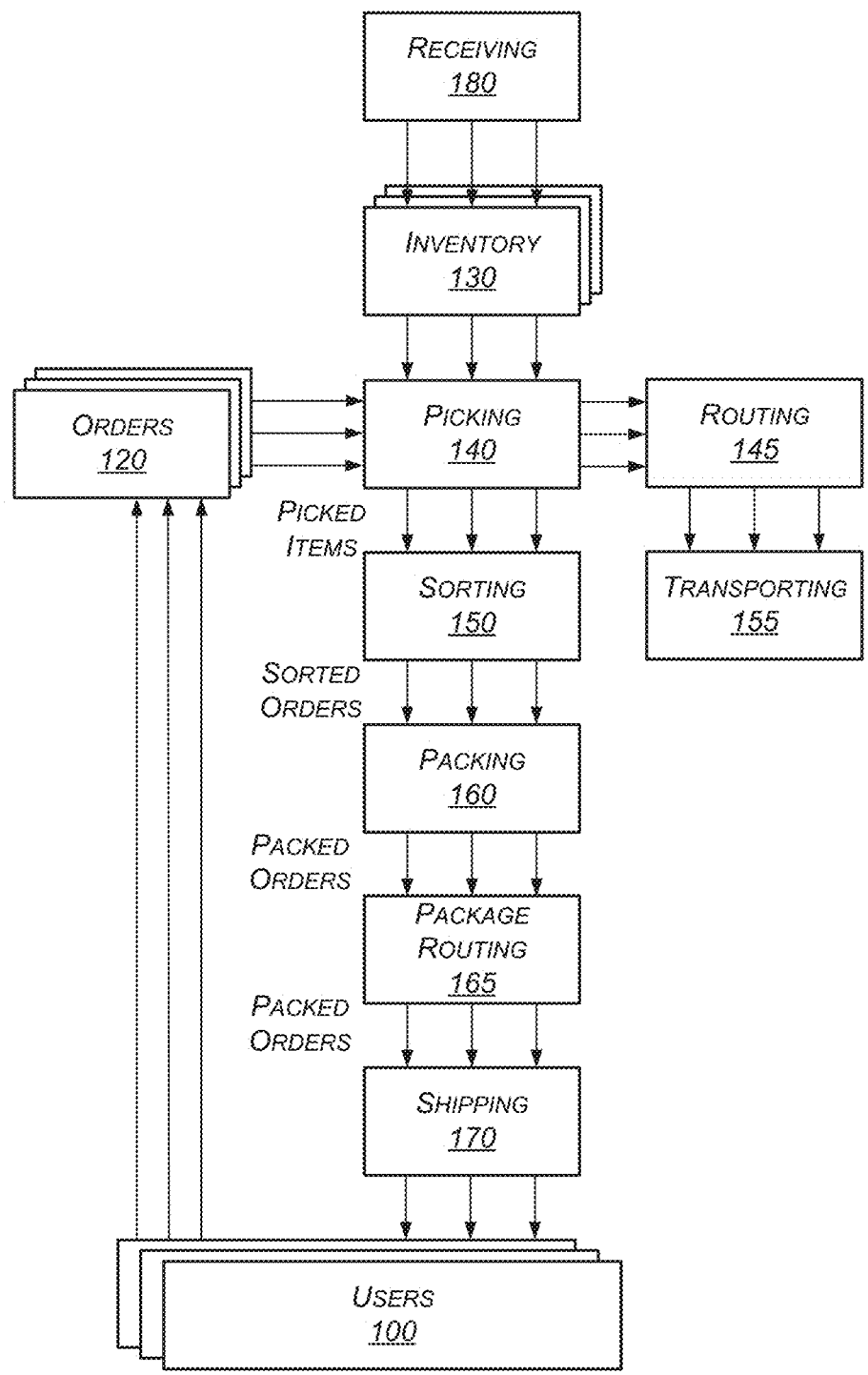
FIG. 1 illustrates a broad view of the operation of a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

This disclosure describes systems and methods for planned and emergency landings of unmanned aerial vehicles ("UAVs") on transportation vehicles (e.g., delivery trucks, public transportation vehicles, etc.). The landings may be planned for conserving energy of the UAVs as they travel toward destinations (e.g., for completing or returning from deliveries of items, etc.), or alternatively may be performed as part of emergency procedures (e.g., when UAVs have low battery levels, are experiencing mechanical issues, etc.). To obtain consent for the landings of the UAVs, an agreement may be made (e.g., with a shipping carrier, public transportation company, etc.) which may specify compensation for the landings and the transportation vehicles that are part of such an agreement may be marked or otherwise identified. For example, a transportation vehicle may include identifying markers on a roof or other surface, such as painted numbers, symbols, a barcode, a QR code, etc. that may be imaged or scanned by a flying UAV to determine that the transportation vehicle may be used for landing. As another example, GPS coordinates may be utilized to identify a transportation vehicle.

In various implementations, known routes for transportation vehicles may be evaluated for selecting a transportation vehicle on which a UAV will land. For example, a UAV travel path and/or travel destination may be compared to the known routes of transportation vehicles, for evaluating which of the known routes is the best match for transporting the UAV closer to the travel destination. As another example, the estimated timing of the known routes of transportation vehicles may be compared to a required timeframe for the travel of the UAV (e.g., to ensure that the UAV will be transported in time to meet a delivery deadline, etc.). As another example, the estimated travel speeds of the transportation vehicles along the associated portions of the known routes (e.g., travel speed on a freeway portion) may be compared to a maximum travel speed and/or safe landing speed of the UAV, to determine if certain transportation vehicles are not candidates for selection because they are traveling too fast on the associated portions of the routes. In various implementations, a number of these types of factors may be weighted and considered in an optimization calculation to determine the best combination of energy savings, time of travel, landing safety, etc. for the selection of a transportation vehicle.

In various implementations, an estimated location where the UAV will meet the transportation vehicle for a landing may be determined. The determination may be based in part on the current estimated or actual location of the transportation vehicle (e.g., from scheduled route data, GPS coordinates, etc.), as well as an estimated travel speed and direction of the transportation vehicle. Once the estimated meeting location has been determined, instructions may be sent to the UAV to fly toward the estimated meeting location. If the transportation vehicle and/or the UAV are traveling at different speeds than were originally expected, the meeting location may correspondingly be adjusted.

In various implementations, the landing of the UAV on the transportation vehicle may require certain maneuvers and/or calculations. For example, if the transportation vehicle will be in motion during the landing, the UAV may need to match the speed of the transportation vehicle, and may need to account for any turns or other changes along the known route of the transportation vehicle, which could occur during the landing process. In various implementations, as part of the landing, one or more securing components may be utilized to help hold the UAV on the transportation vehicle. For example, one or more hooking components may be utilized to securely maintain the UAV on the transportation vehicle as part of the landing and/or while the transportation vehicle travels along the known route (e.g., which may include high speeds on a freeway, sharp turns at intersections, etc.). As another example, the UAV may include an electromagnetic component for attaching to a roof or other surface of a transportation vehicle.

In various implementations, different types of communications may be provided as part of a landing process. For example, a message regarding a planned landing may be sent to a management system and/or driver of a transportation vehicle, to allow the management system and/or driver to confirm that the landing is acceptable, to allow the driver to be prepared for the landing, etc. Once the landing is complete, a message may be sent to confirm that the landing was successful, and the current location of the UAV may be associated with the transportation vehicle.

In various implementations, emergency landings may involve consideration of different factors than regular planned landings. For example, in comparison to a regular planned landing, an emergency landing may be performed in response to detected condition (e.g., a low battery level, a mechanical issue with part of a propulsion system, etc.) that was not planned for and which inhibits the ability of the UAV to fly to a next planned destination along a travel path. As a result, in some circumstances the transportation vehicle that is selected for an emergency landing may be a first available or closest transportation vehicle and/or may otherwise not be one that is heading in the same direction as a planned travel destination of the UAV. In various implementations, after an emergency landing has been performed, the retrieval of the UAV may be performed in various ways. For example, an agent may be dispatched to retrieve the UAV at a parked or planned meeting location for the transportation vehicle. As another example, a management system for the transportation vehicle may be contacted to request that an agent retrieve the UAV from the roof and return the UAV (e.g., through shipping, hand delivery, etc.).

A block diagram of a materials handling facility which, in one implementation, may be an order fulfillment facility configured to utilize various systems and methods described herein (e.g., with regard to the travel of UAVs for delivering items to users), is illustrated in FIG. 1. In this example, multiple users 100 may submit orders 120, where each order 120 specifies one or more items from inventory 130 to be shipped or otherwise delivered (e.g., by a UAV) to the user or to another entity specified in the order. An order fulfillment facility typically includes a receiving operation 180 for receiving shipments of stock from various vendors and storing the received stock in inventory 130. To fulfill the orders 120, the item(s) specified in each order may be retrieved or "picked" from inventory 130 (which may also be referred to as stock storage) in the order fulfillment facility, as indicated by picking operation 140. The picking operation 140 may in various implementations be manual or automated (e.g., robotic). In some implementations, the items of a user order may be divided into multiple shipment sets for fulfillment by a planning service before fulfillment instructions are generated (not shown). As used herein, the term "shipment set" may refer to a single item of a user's order, multiple items of a user's order, or all items of a user's order.

In some instances, when a UAV, such as the UAV described below with respect to FIG. 4, has been designated for a delivery, the item(s) of one or more shipment sets may be picked at the picking operation 140 and sent to a routing operation 145. In various implementations, the UAVs may each include a unique identifier, such as a bar code, QR code, unique number, etc., to enable tracking, identification, and/or association of items to be carried by each UAV. For example, during a picking operation, an agent or automated system (e.g., robotic) within the materials handling facility may scan the bar code of the UAV or a container that the UAV will carry and/or scan a barcode or identifier of the picked item as the item is picked and/or placed into the UAV or container. Scanning of the UAV or container and/or the picked item may be utilized to associate and track the item with the UAV. As the UAVs and/or containers that the UAVs will carry are filled, the routing operation 145 may route the UAVs and/or container to an appropriate transporting operation 155 from which the UAVs may take off to fly toward a designated delivery location along a travel path. The travel path may include landing on a transportation vehicle for temporary transport, as will be described in more detail below with respect to FIG. 3.

In other examples, some picked items may be delivered to one or more stations in the order fulfillment facility for sorting 150 into their respective shipment sets and for packing 160 in shipping packages. A package routing operation 165 may sort orders for packing in shipping packages to one of two or more shipping operations 170, from which they may be shipped to the users 100. In various implementations, UAVs may be utilized for the shipping and may be considered as an alternative to shipping by traditional carriers. Depending on the specific implementation, the package routing operation 165 may be either automated or manual. The package routing operation 165 may receive an indication of the destination to which each packed shipment set should be routed from a central control system. In some instances, the destination may be the final destination identified by the user or a destination at which transfer of a shipment set may occur for final delivery to the user. The package routing operation 165 may also determine a routing destination for each packed shipment set dependent on the size of a shipping package in which the shipment set is contained and/or based on whether the shipment set will be delivered by a traditional carrier or a UAV.

The arrangement and order of operations illustrated by FIG. 1 is merely one example of many possible implementations of the operation of a materials handling facility, such as an order fulfillment facility, that enables fulfillment of user orders. Other types of materials handling, manufacturing, or order fulfillment facilities may include different, fewer, or additional operations and resources, according to different implementations.

Figure 2:
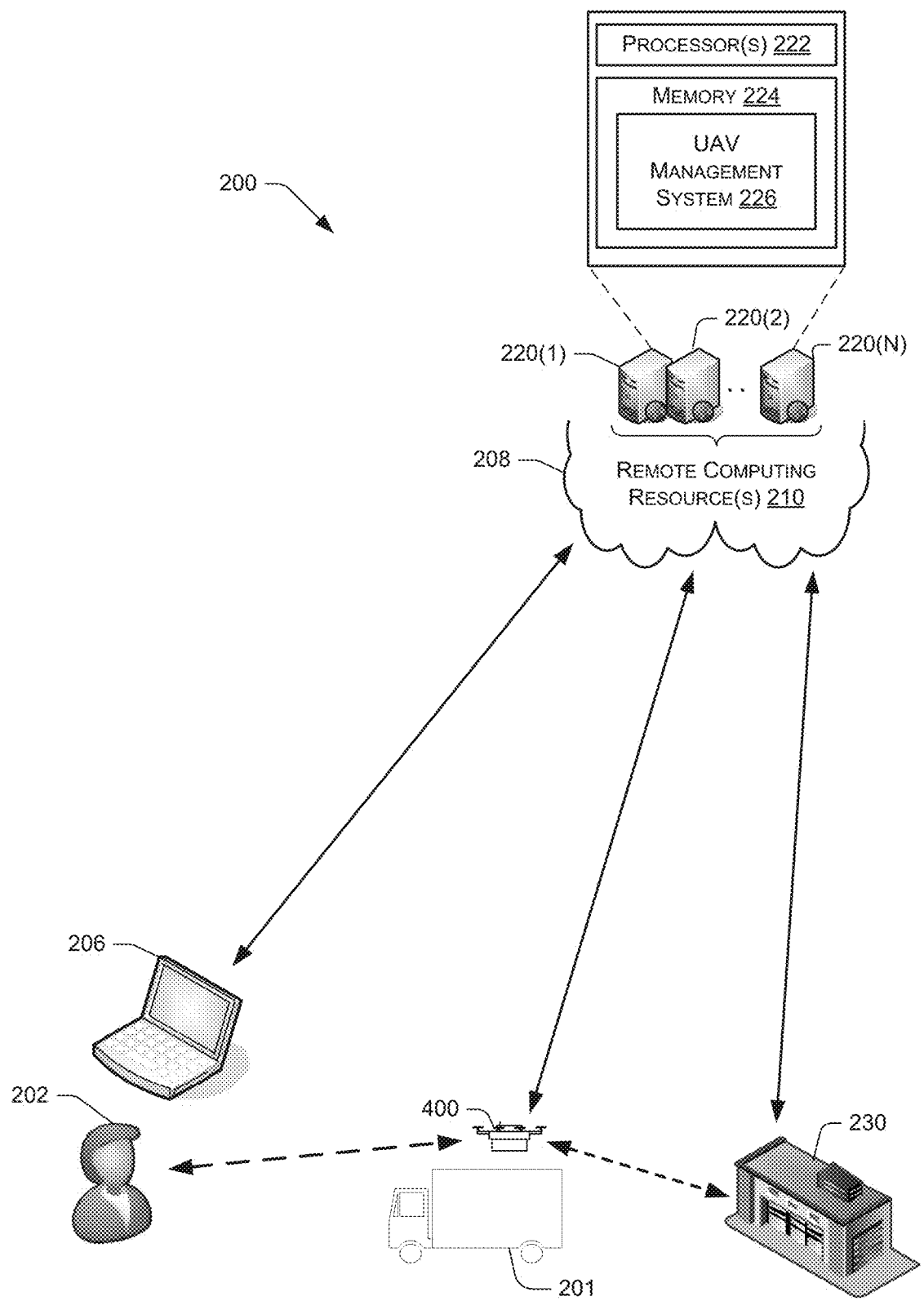
FIG. 2 depicts a block diagram of an unmanned aerial vehicle environment, according to some implementations.

FIG. 2 is a block diagram of an illustrative UAV environment 200 that includes a user interface that allows a user 202 to place an order for an item that will be transported by a UAV 400 to a delivery location (e.g., as will be described in more detail below with respect to FIG. 3). The user interface may be a graphical user interface, an audio only interface, a multi-mode interface, or any other interface for interacting with the user 202. The user interface may be provided to the user 202 through any type of electronic device 206, such as a tablet, desktop, laptop, smart phone, personal digital assistant, netbook, etc. The user interface may be delivered to the electronic device 206 by one or more remote computing resources 210 that make up part or all of an electronic commerce shopping environment. In other embodiments, the user interface may be in direct communication between a user and an agent.

The remote computing resources 210 may form a portion of a network-accessible computing platform implemented as a computing infrastructure of processors, storage, software, data access, and other components that is maintained and accessible via a network 208. Services, such as e-commerce shopping services, offered by the remote computing resources 210 do not require that the user have knowledge of the physical location and configuration of the system that delivers the services. The electronic device 206 may communicatively couple to the remote computing resources 210 via the network 208 which may represent wired technologies (e.g., wires, USB, fiber optic cable, etc.), wireless technologies (e.g., RF, cellular, satellite, Bluetooth, etc.), and/or other connection technologies. The network 208 carries data between the electronic device 206 and the remote computing resources 210.

After receiving from a user 202 an order for an item that may be transported by a UAV 400 to a delivery location, the electronic device 206 may send this information to the remote computing resources 210 over the network 208. As illustrated, the remote computing resources 210 may include one or more servers, such as servers 220(1), 220(2) . . . 220(N). These servers 220(1)-(N) may be arranged in any number of ways, such as server farms, stacks, and the like that are commonly used in data centers. Furthermore, the servers 220(1)-(N) may include one or more processors 222 and memory 224 that may store a UAV management system 226. The UAV management system 226 may be configured, for example, to perform order planning and filling of UAVs 400 with orders (e.g., at a materials handling facility 230) and/or scheduling of deliveries by UAVs 400 to user specified delivery locations. In fulfilling orders that may be transported by a UAV, the materials handling facility 230 may fulfill orders using any of the processes discussed above with respect to FIG. 1.

The UAV 400 may communicatively couple to the remote computing resources 210 via the network 208. For example, the communications to and from the UAVs 400 may utilize wireless antennas of the UAVs. Communications may be to and from a control system of each of the UAVs (as described below with respect to FIG. 7).

The UAV management system 226 may also be configured, for example, to communicate with the UAVs 400. In various implementations, the general activities of UAVs 400, including those related to the travel of the UAVs to and from the designated delivery locations and the delivery and receiving of items by the UAVs, may be coordinated and/or otherwise controlled by the UAV management system 226. For example, the UAV management system 226 may determine travel paths for the travel of the UAVs 400 to the designated delivery locations, including possible landings on transportation vehicles 201, as will be described in more detail below with respect to FIG. 3. In various implementations, the UAV management system 226 may send instructions to or otherwise control the UAVs 400 for delivering and/or receiving items, travelling between locations, landing on transportation vehicles 201 as part of planned or emergency landings, etc. As an example, instructions may be transmitted to a UAV 400 that indicates a location where the UAV 400 may meet a transportation vehicle 201 for landing on the transportation vehicle for temporary transport as the transportation vehicle travels along a known route.

In various implementations, the remote computing resources 210 and/or UAV management system 226 may also receive tracking data (e.g., GPS) regarding the coordinates of the transportation vehicles 201 and/or UAVs 400. The GPS data may be utilized for various purposes, such as planning meeting locations, answering location status requests or for sending notifications regarding the current locations of the transportation vehicles 201 and/or UAVs 400. For example, a user may request that a notification be sent when a UAV 400 with an ordered item is approaching. As another example, a notification may be sent to a transportation vehicle 201 when a UAV 400 is approaching a meeting location where the UAV is to meet the transportation vehicle. Notifications may also be sent from the UAV 400 to the remote computing resources 210 and/or UAV management system 226 regarding various events (e.g., when a UAV has taken off and left the transportation vehicle, when a UAV has delivered an item, when a UAV is returning to a materials handling facility 230, in a case of an emergency landing, etc.).

Figure 3:
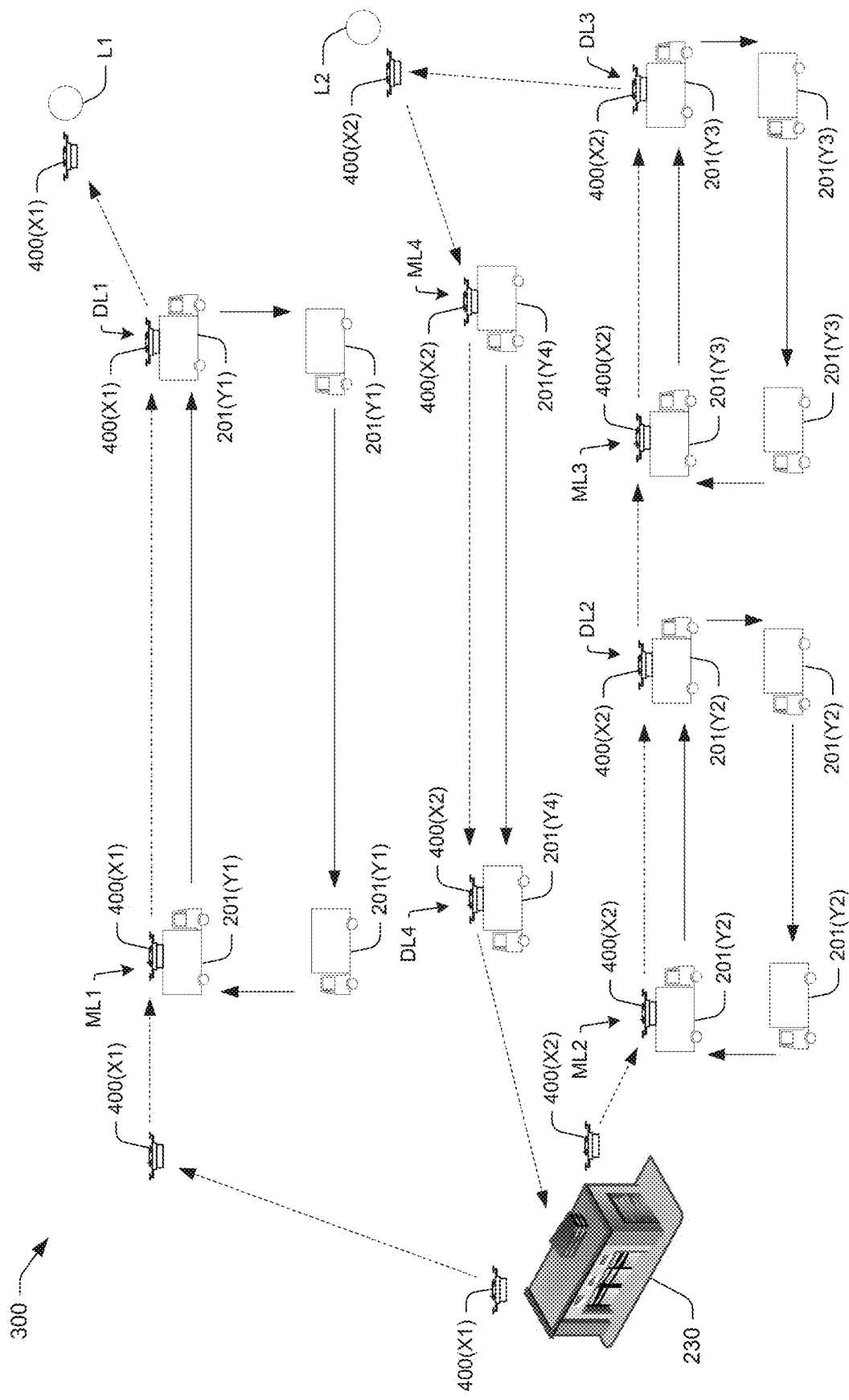
FIG. 3 depicts a block diagram illustrating routes of transportation vehicles that unmanned aerial vehicles may land on for transport, according to some implementations.

FIG. 3 depicts a block diagram of a UAV environment 300 illustrating routes of transportation vehicles 201 that unmanned aerial vehicles 400 may land on for transport, according to some implementations. In various implementations, the transportation vehicles 201 may include trucks, busses, automobiles, trains, aircraft, watercraft, etc., and the routes of the transportation vehicles may be for transporting passengers, items, etc. As illustrated in FIG. 3, a group of transportation vehicles 201(Y1)-201(Y4) are shown as following known routes as indicated by solid arrows. The movements of two unmanned aerial vehicles 400(X1) and 400(X2) are indicated by dotted line arrows. As a first example, instructions are sent (e.g. from the UAV management system 226) to the UAV 400(X1) to take off from a departure location at the materials handling facility 230, and to begin flying toward a destination. After a period of time, the UAV 400(X1) flies toward a meeting location ML1 where the UAV 400(X1) will land on the transportation vehicle 201(Y1) as it travels along a route.

After landing on the transportation vehicle 201(Y1) at the meeting location ML1, the UAV 400(X1) is transported by the transportation vehicle 201(Y1) for a portion of the route, until an estimated departure location DL1 is reached. At the estimated departure location DL1, the UAV 400(X1) follows instructions (e.g. as initially or subsequently provided by the UAV management system 226) to take off from the transportation vehicle 201(Y1) and fly toward a travel destination at a location L1. In various implementations, the location L1 may be a delivery location where an item is to be delivered, a receiving location where an item is to be received, or another type of location to which the UAV 400(X1) may travel. In an implementation where the UAV 400(X1) is to subsequently return to the materials handling facility 230, the UAV 400(X1) may fly the entire distance back to the materials handling facility 230. Alternatively, one of the transportation vehicles 201(Y1)-201(Y4) may be selected for the UAV 400(X1) to land on for transport closer to the travel destination of the materials handling facility 230, as will be described in more detail below with respect to the UAV 400(X2). In such an example, rather than flying the entire distance back to the materials handling facility, the UAV 400(X1) will fly to and land on a selected transportation vehicle and be transported by the transportation vehicle to a location closer to the materials handling facility 230.

As a second example, instructions are sent (e.g. from the UAV management system 226) to the UAV 400(X2) to take off from a departure location at the materials handling facility 230 and begin flying toward a destination at a meeting location ML2. The UAV 400(X2) arrives at the meeting location ML2 and lands on the transportation vehicle 201(Y2). The UAV 400(X2) is then transported by the transportation vehicle 201(Y2) as it travels along a portion of the route until an estimated departure location DL2 is reached. At the estimated departure location DL2, the UAV 400(X2) takes off from the transportation vehicle 201(Y2) and flies toward a destination at a meeting location ML3. After arriving at the meeting location ML3, the UAV 400(X2) lands on the transportation vehicle 201(Y3). The UAV 400(X2) is then transported by the transportation vehicle 201(Y3) for a portion of the route until an estimated departure location DL3 is reached. At the estimated departure location DL3, the UAV 400(X2) takes off from the transportation vehicle 203(Y3) and follows a travel path to fly toward a travel destination at a location L2. In various implementations, the location L2 may be a delivery location where an item is to be delivered, a receiving location where an item is to be received, or another type of location to which the UAV 400(X2) may travel. It will be appreciated that the example travel of the UAV 400(X2) illustrates how a UAV may land on multiple transportation vehicles for transportation as part of a travel path, and how each portion of each route that the UAV is transported on brings the UAV closer to the travel destination at the location L2.

For a travel path for returning to the materials handling facility 230, the UAV 400(X2) takes off from a departure location at the location L2, and begins to fly toward a destination at a meeting location ML4. At the meeting location ML4, the UAV 400(X2) lands on the transportation vehicle 201(Y4). The UAV 400(X2) is then transported by the transportation vehicle 201(Y4) along a portion of a route until an estimated departure location DL4 is reached. At the estimated departure location DL4, the UAV 400(X2) takes off from the transportation vehicle 201(Y4) and flies toward a travel destination at the materials handling facility 230.

It will be appreciated with respect to the above-described examples, that different selections may have alternatively been made with respect to which of the transportation vehicles 201(Y1)-201(Y4) the UAVs 400(X1) and 400(X2) landed on. For example, for the return travel path of the UAV 400(X2) toward the travel destination of the materials handling facility 230, a selection may have been made between landing on the transportation vehicle 201(Y1), 201(Y4), or the combination of the transportation vehicles 201(Y3) and 201(Y2), during the portions of the routes that were headed in the direction of the materials handling facility 230. Various factors that may be evaluated as part of a process for selecting a transportation vehicle for a UAV to land on will be described in more detail below with respect to FIG. 10.

Figure 4:
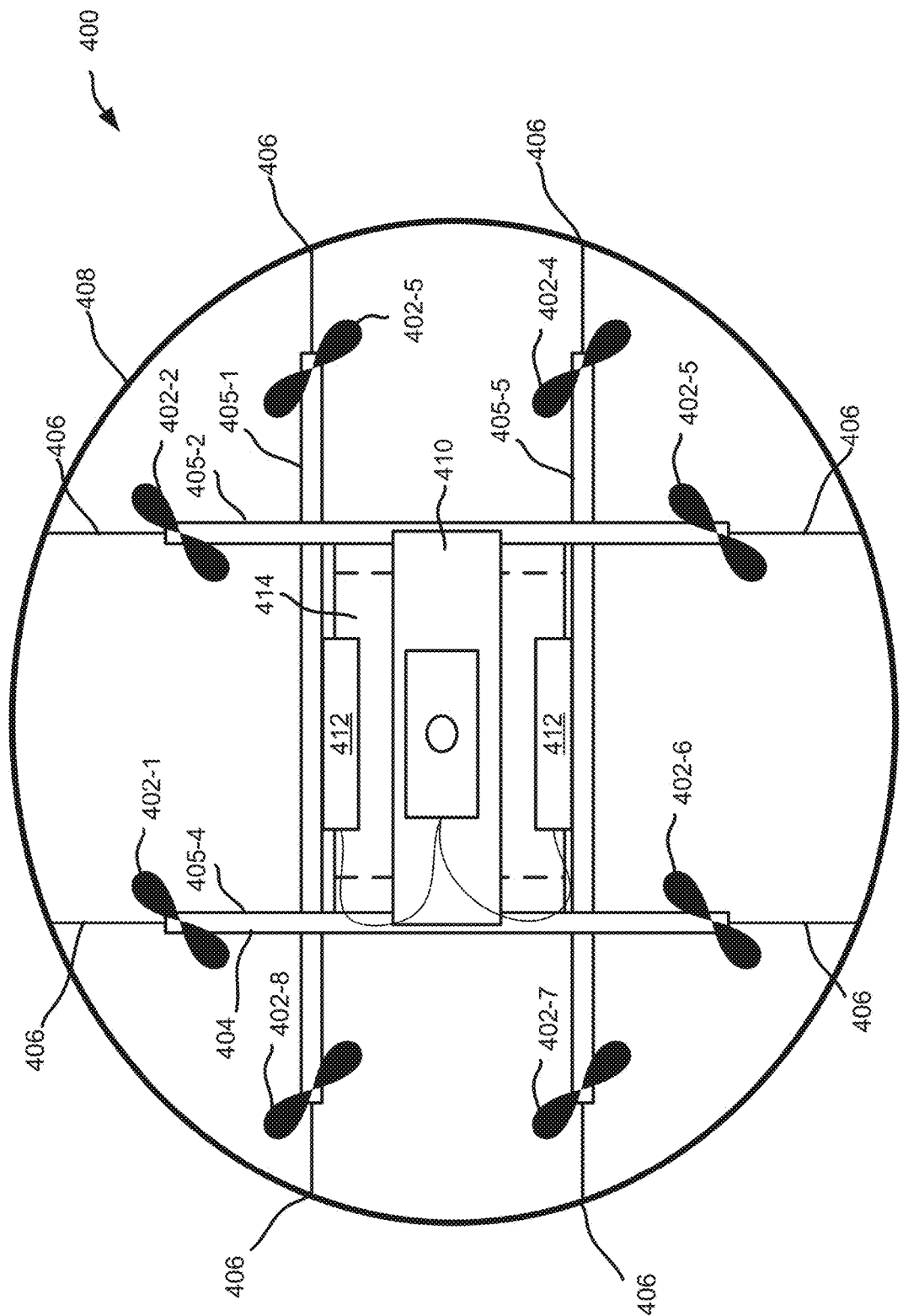
FIG. 4 depicts a block diagram of a top-down view of an unmanned aerial vehicle, according to an implementation.

FIG. 4 illustrates a block diagram of a top-down view of a UAV 400, according to an implementation. As illustrated, the UAV 400 includes eight propellers 402-1, 402-2, 402-3, 402-4, 402-5, 402-6, 402-7, 402-8 spaced about the frame 404 of the UAV as part of a propulsion system for the UAV 400. The propellers 402 may be any form of propeller (e.g., graphite, carbon fiber) and of a size sufficient to lift the UAV 400 and any item engaged by the UAV 400 so that the UAV 400 can navigate through the air, for example, to deliver an item to or from a user specified location. While this example includes eight propellers, in other implementations, more or fewer propellers may be utilized. Likewise, in some implementations, the propellers may be positioned at different locations on the UAV 400. In addition, alternative methods of propulsion may be utilized. For example, fans, jets, turbojets, turbo fans, jet engines, and the like may be used to propel the UAV.

The frame 404 or body of the UAV 400 may likewise be of any suitable material, such as graphite, carbon fiber, and/or aluminum. In this example, the frame 404 of the UAV 400 includes four rigid members 405-1, 405-2, 405-3, 405-4, or beams arranged in a hash pattern with the rigid members intersecting and joined at approximately perpendicular angles. In this example, rigid members 405-1 and 405-3 are arranged parallel to one another and are approximately the same length. Rigid members 405-2 and 405-4 are arranged parallel to one another, yet perpendicular to rigid members 405-1 and 405-3. Rigid members 405-2 and 405-4 are approximately the same length. In some embodiments, all of the rigid members 405 may be of approximately the same length, while in other implementations, some or all of the rigid members may be of different lengths. Likewise, the spacing between the two sets of rigid members may be approximately the same or different.

While the implementation illustrated in FIG. 4 includes four rigid members 405 that are joined to form the frame 404, in other implementations, there may be fewer or more components to the frame 404. For example, rather than four rigid members, in other implementations, the frame 404 of the UAV 400 may be configured to include six rigid members. In such an example, two of the rigid members 405-2, 405-4 may be positioned parallel to one another. Rigid members 405-1, 405-3 and two additional rigid members on either side of rigid members 405-1, 405-3 may all be positioned parallel to one another and perpendicular to rigid members 405-2, 405-4. With additional rigid members, additional cavities with rigid members on all four sides may be formed by the frame 404. As discussed further below, a cavity within the frame 404 may be configured to include an item engagement mechanism for the engagement, transport, and delivery of item(s) and/or containers that contain item(s).

In some implementations, the UAV may be configured for aerodynamics. For example, an aerodynamic housing may be included on the UAV that encloses the UAV control system 410, one or more of the rigid members 405, the frame 404, and/or other components of the UAV 400. The housing may be made of any suitable material(s) such as graphite, carbon fiber, aluminum, etc. Likewise, in some implementations, the location and/or the shape of the item engagement mechanism and/or any items or containers may be aerodynamically designed. As will be described in more detail below, in some instances a container may be utilized for holding an item, wherein the item engagement mechanism engages the item by engaging the container. For example, specially shaped containers for use with the UAV 400 may be aerodynamically designed and provided in a materials handling facility 230, such that an agent or automated system is able to select one of the containers and place the item in the container for engagement by the UAV 400. In some implementations, the item engagement mechanism may be configured such that when an item and/or container is engaged it is enclosed within the frame and/or housing of the UAV 400 so that no additional drag is created during transport of the item. In other implementations, the item and/or container may be shaped to reduce drag and provide a more aerodynamic design. For example, if a portion of a container extends below the UAV when engaged, the exposed portion of the container may have a curved shape.

The propellers 402 and corresponding propeller motors are positioned at both ends of each rigid member 405. The propeller motors may be any form of motor capable of generating enough speed with the propellers to lift the UAV 400 and any engaged item thereby enabling aerial transport of the item. Extending outward from each rigid member is a support arm 406 that is connected to a safety barrier 408. In this example, the safety barrier is positioned around and attached to the UAV 400 in such a manner that the motors and propellers 402 are within the perimeter of the safety barrier 408. The safety barrier may be plastic, rubber, etc. Likewise, depending on the length of the support arms 406 and/or the length, number or positioning of the rigid members 405, the safety barrier may be round, oval, or any other shape.

Mounted to the frame 404 is the UAV control system 410. In this example, the UAV control system 410 is mounted in the middle and on top of the frame 404. The UAV control system 410, as discussed in further detail below with respect to FIG. 7, controls the operation, routing, navigation, communication, object sense and avoid, and the item engagement mechanism of the UAV 400.

The UAV 400 also includes one or more power modules 412. In this example, the UAV 400 includes two power modules 412 that are removably mounted to the frame 404. The power module for the UAV may be in the form of battery power, solar power, gas power, super capacitor, fuel cell, alternative power generation source, or a combination thereof. For example, the power modules 412 may each be a 6000 mAh lithium-ion polymer battery, polymer lithium ion (Li-poly, Li-Pol, LiPo, LIP, PLI, or Lip) battery. The power module(s) 412 are coupled to and provide power for the UAV control system 410 and the propeller motors of the propulsion system.

The power modules 412 store energy with corresponding energy levels. In various implementations, the stored energy of the power modules 412 may be conserved through various techniques. For example, for part of a travel path the UAV 400 may be flown to and land on a transportation vehicle that is travelling along a known route. In such an example, the UAV may remain on the transportation vehicle for transport during a determined portion of the known route that brings the UAV 400 closer to the travel destination of the UAV 400 (e.g., a delivery location).

The energy levels of the power modules 412 may be monitored by the UAV control system 410. In one implementation, if the energy levels are determined to be below a critical threshold during a flight of the UAV, an emergency maneuver (e.g., an emergency landing) may be required. In some implementations, one or more of the power modules may be configured such that it can be autonomously removed and/or replaced with another power module while the UAV is landed. In some implementations, when the UAV lands at a designated location (e.g., on a transportation vehicle 201), the UAV may engage with a charging member at the location that will recharge the power module.

As mentioned above, the UAV 400 may also include an item engagement mechanism 414. The item engagement mechanism may be configured to engage and disengage items and/or containers that hold items. In this example, the item engagement mechanism 414 is positioned within a cavity of the frame 404 that is formed by the intersections of the rigid members 405. The item engagement mechanism may be positioned beneath the UAV control system 410. In implementations with additional rigid members, the UAV may include additional item engagement mechanisms and/or the item engagement mechanism 414 may be positioned in a different cavity within the frame 404. The item engagement mechanism may be of any size sufficient to securely engage and disengage items and/or containers that contain items. In other implementations, the engagement mechanism may operate as the container, containing the item(s) to be delivered. The item engagement mechanism communicates with (via wired or wireless communication) and is controlled by the UAV control system 410.

While the implementations of the UAV discussed herein utilize propellers to achieve and maintain flight, in other implementations, the UAV may be configured in other manners. In one implementation, the UAV may include fixed wings and/or a combination of both propellers and fixed wings. For example, the UAV may utilize one or more propellers to enable takeoff and landing and a fixed wing configuration or a combination wing and propeller configuration to sustain flight while the UAV is airborne.

As will be described in more detail below with respect to FIG. 7, the UAV control system 410 may operate in conjunction with or may otherwise utilize or communicate (e.g., via wired and/or wireless communication) with one or more components of the UAV management system 226. Likewise, components of the UAV management system 226 may generally interact and communicate with the UAV control system 410.

Figure 5:
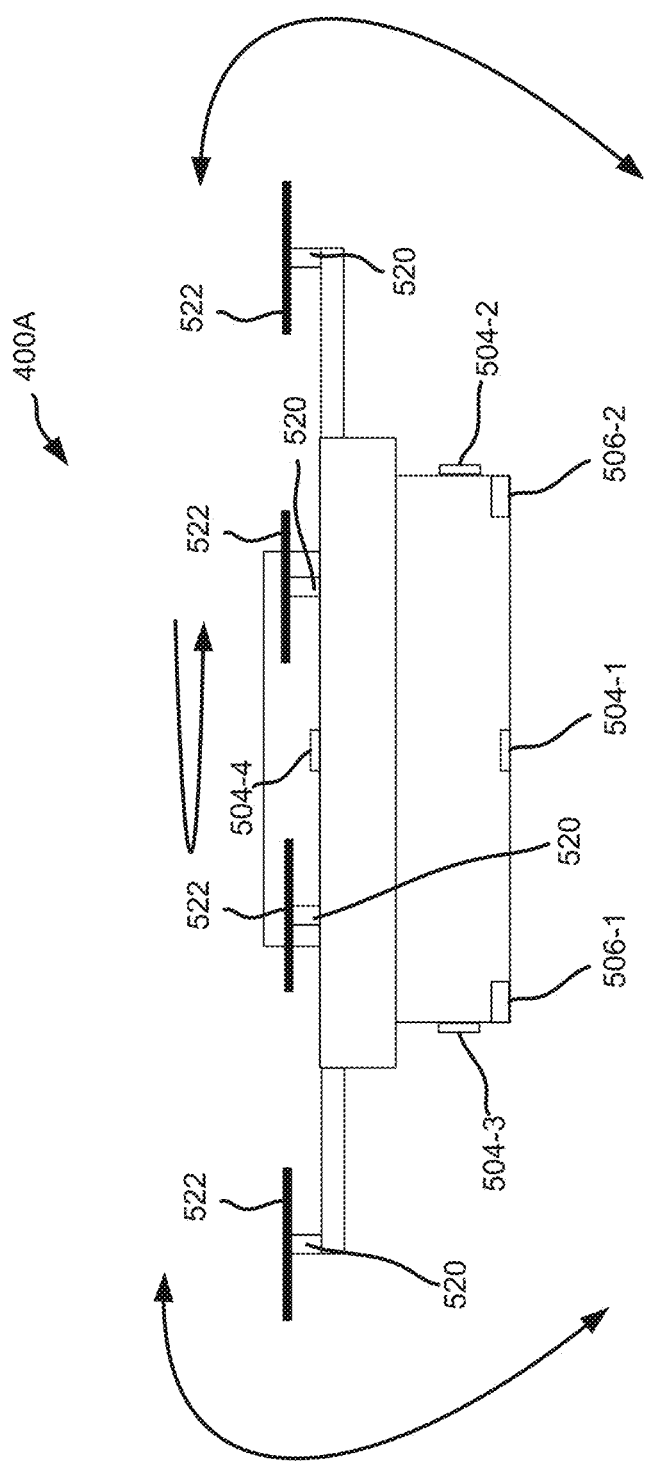
FIG. 5 depicts a block diagram of a side view of an unmanned aerial vehicle, according to an implementation.

FIG. 5 depicts a block diagram of a side view 500 of an UAV 400A, according to an implementation. In the side view of the UAV illustrated in FIG. 5, four motors 520 and propellers 522 are visible as part of the propulsion system of the UAV. In other implementations, additional or fewer motors 520 and/or propellers may be included in the UAV 400A. In this example, the motors 520 may all be mounted at 90 degrees with respect to the UAV 400A. As will be described in more detail below with respect to FIG. 6, in an alternative implementation the mountings of the motors may be adjustable (e.g., for increased maneuverability when landing on a moving transportation vehicle, for performing an electricity generation procedure while being transported by a transportation vehicle, etc.).

For configurations such as that illustrated in FIG. 5 where the propellers are fixed relative to the body of the UAV, certain flight and landing maneuvers (e.g. for landing on a transportation vehicle) may be accomplished in some instances by manipulating the pitch, yaw and/or roll of the UAV. It will be appreciated that with UAVs, such as a quad-copter or an octo-copter, the general direction of travel of the UAV may be maintained even though the pitch, yaw, and roll are altered. For example, an UAV may be moving north and the yaw may be adjusted so that the UAV 400A rotates in a clockwise direction (e.g., so as to position a particular sensor 504 or securing component 506 relative to a transportation vehicle on which a landing will be made). The rotation can occur without altering the direction of flight. Likewise, the pitch and/or roll can be adjusted without altering the flight path of the UAV 400A.

As shown in FIG. 5, various sensors 504 may be mounted to the UAV 400A. For example, a sensor 504-1 may be mounted near the bottom of the UAV 400A. Similarly, sensors 504-2, 504-3 and 504-4 may be mounted to the front, back and top of the UAV 400A, respectively. The sensors 504 may be of various types. For example, the sensor 504-1 may include an imaging sensor that may be utilized to image or scan identifying markers (e.g. painted numbers, bar codes, QR codes, etc.) on a roof or other surface of a transportation vehicle on which the UAV 400A may land. As another example, one or more of the sensors 504 may include airflow sensors, for determining winds relative to the UAV, such as may be considered during landing procedures for landing a UAV on a moving transportation vehicle, and/or with respect to energy generation procedures, as will be described in more detail below with respect to FIG. 6. In another example, one or more of the sensors 504 may include a distance detection sensor for measuring and monitoring the distance between the UAV 400A and a transportation vehicle (or other object). While the example illustrated in FIG. 5 includes four sensors 504 mounted to the UAV 400, in other implementations, fewer or additional sensors may be utilized.

Various securing components 506 may also be provided that may be utilized for securing the UAV 400A to a transportation vehicle. For example, securing components 506-1 and 506-2 (e.g., including electromagnets, hooking mechanisms, etc.) are provided on the bottom of the UAV 400A. The securing components 506-1 and 506-2 may be utilized during or after a landing procedure and may couple to corresponding securing components on a transportation vehicle. In various implementations, different types of corresponding securing components may be provided on transportation vehicles. For example, if a transportation vehicle includes a metal roof, the metal roof may function as a passive securing component to which one or both of the securing components 506-1 and 506-2 (e.g., electromagnets) may attach. As another example, a securing component (e.g., a hooking mechanism) may be added to the transportation vehicle that may couple to one or both of the securing components 506-1 and 506-2 (e.g., corresponding hooks, bars, etc.). In various implementations, one or both of the securing components 506-1 and 506-2 may also or alternatively be charging components (e.g., inductive charging elements, plugs, sockets, ports, etc.) that may couple to corresponding charging components on the transportation vehicle and provide energy to recharge the power modules of the UAV 400A.

Figure 6:
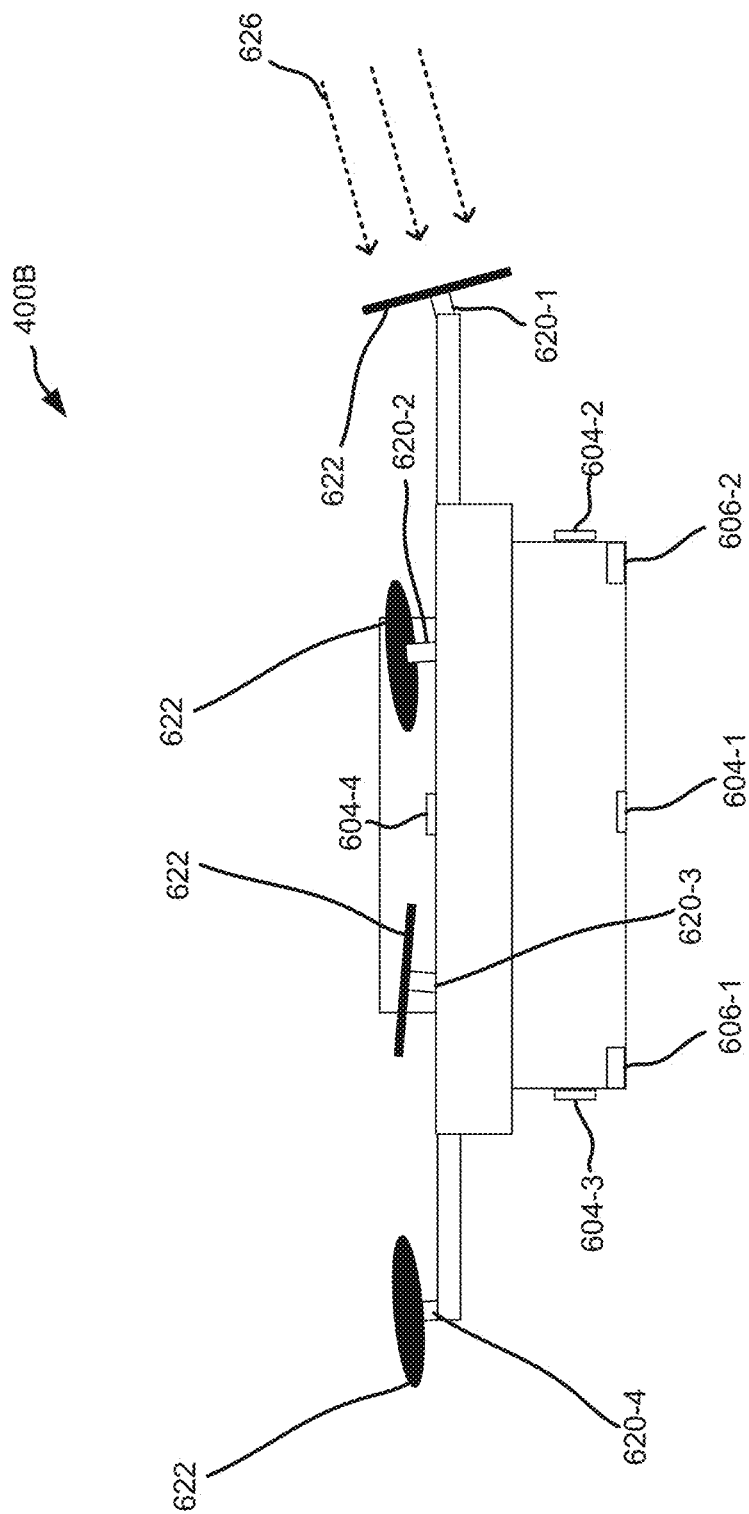
FIG. 6 depicts a block diagram of another side view of an unmanned aerial vehicle, according to an implementation.

FIG. 6 depicts a block diagram of another side view 600 of a UAV 400B, according to an implementation. As shown in FIG. 6, four motors 620-1 to 620-4 and corresponding propellers 622 are visible as part of the propulsion system of the UAV 400B. In other implementations, additional or fewer motors 620 and/or propellers may be included in the UAV 400B. For example, in some implementations, propellers may be mounted in pairs. In addition, four sensors 604-1 to 604-4 and two securing components 606-1 and 606-2 are illustrated as attached to the body of the UAV, which may operate similarly to the sensors 504-1 to 504-4 and securing components 506-1 and 506-2 described above with respect to FIG. 5.

FIG. 6 illustrates the right side view of the UAV 400 such that the motor 620-1 is at the front of the UAV 400B and the motor 620-4 is at the rear of the UAV 400B. The motors 620 and corresponding propellers 622 may have an orientation that is offset in any direction with respect to the body of the UAV 400, and the offset may be adjustable. In some implementations, the orientation offset of one or more of the motors 620 may be adjusted while the UAV is in operation. For example, during normal flight, all of the motors 620 may be positioned with 0 degrees of offset (e.g., wherein the plane of rotation of the propeller is approximately parallel to a top surface of the body of the UAV). When a determination is made that certain types of maneuvers are to be performed (e.g. as part of a landing on a moving transportation vehicle or as part of an energy generation procedure), the orientation of one or more of the motors 620 and corresponding propellers 622 may be adjusted. In some instances, the orientations of the motors 620 and corresponding propellers 622 may be made to increase the agility of the UAV 400B. For example, some of the motors (e.g., 620-2, 620-3 and 620-4) and corresponding propellers 622 may be offset between approximately 0-10 degrees with respect to the body of the UAV 400B and/or each other, in order to increase the agility of the UAV 400B. Once the maneuvers and/or electricity generation procedures are complete, the one or more motors 620 and corresponding propellers 622 may be reoriented (e.g., back to a 0 degree offset).

As an example of an electricity generation procedure, the orientation of the motor 620-1 is shown to have been altered such that the corresponding propeller 622 faces an airflow 626 (e.g., from a wind). In one implementation, once the UAV has landed on a transportation vehicle, the orientation of the motor 620-1 and corresponding propeller 622 may be adjusted to the illustrated orientation. In the illustrated orientation, the airflow 626 (e.g., as the transportation vehicle moves forward) may be utilized to rotate the propeller 622 and correspondingly generate electricity from the motor 620-1.

Figure 7:
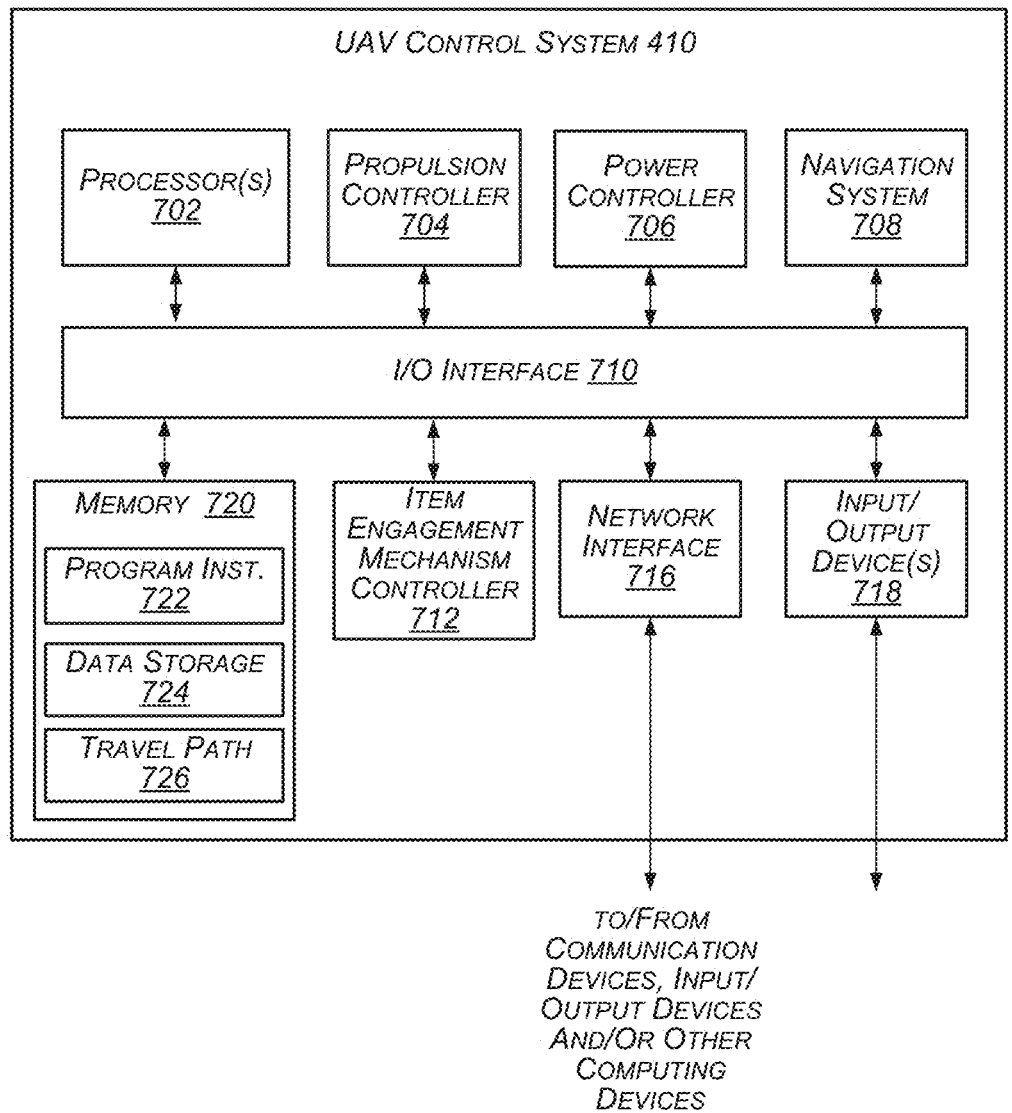
FIG. 7 depicts a block diagram illustrating various components of an unmanned aerial vehicle control system, according to an implementation.

FIG. 7 is a block diagram illustrating an example UAV control system 410, such as may be utilized for the UAV 400 of FIG. 4, or for other types of UAVs. In various examples, the block diagram of FIG. 4 may be illustrative of one or more aspects of the UAV control system 410 that may be used to implement the various systems and methods discussed herein. In the illustrated implementation, the UAV control system 410 includes one or more processors 702, coupled to a non-transitory computer readable storage medium 720 via an input/output (I/O) interface 710. The UAV control system 410 may also include a propulsion controller 704 (e.g., for controlling one or more motors, engines, etc.), a power controller 706 (e.g., for controlling, monitoring and/or regulating the use and charging of the power modules and/or electricity generation procedures) and/or a navigation system 708. The UAV control system 410 further includes an item engagement mechanism controller 712, a network interface 716, and one or more input/output devices 718.

In various implementations, the UAV control system 410 may be a uniprocessor system including one processor 702, or a multiprocessor system including several processors 702 (e.g., two, four, eight, or another suitable number). The processor(s) 702 may be any suitable processor capable of executing instructions. For example, in various implementations, the processor(s) 702 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 702 may commonly, but not necessarily, implement the same ISA.

The non-transitory computer readable storage medium 720 may be configured to store executable instructions, data, travel paths, and/or data items accessible by the processor(s) 702. In various implementations, the non-transitory computer readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 720 as program instructions 722, data storage 724 and travel path data 726, respectively. In other implementations, program instructions, data, and/or travel paths may be received, sent, or stored upon different types of computer-accessible media, such as non-transitory media, or on similar media separate from the non-transitory computer readable storage medium 720 or the UAV control system 410. Generally speaking, a non-transitory, computer readable storage medium may include storage media or memory media such as magnetic or optical media, e.g., disk or CD/DVD-ROM, coupled to the UAV control system 410 via the I/O interface 710. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 716.

In one implementation, the I/O interface 710 may be configured to coordinate I/O traffic between the processor(s) 702, the non-transitory computer readable storage medium 720, and any peripheral devices, the network interface or other peripheral interfaces, such as input/output devices 718. In some implementations, the I/O interface 710 may perform any necessary protocol, timing or other data transformations to convert data signals from one component (e.g., non-transitory computer readable storage medium 720) into a format suitable for use by another component (e.g., processor(s) 702). In some implementations, the I/O interface 710 may include support for devices attached through various types of peripheral buses, such as a variant of the Peripheral Component Interconnect (PCI) bus standard or the Universal Serial Bus (USB) standard, for example. In some implementations, the function of the I/O interface 710 may be split into two or more separate components, such as a north bridge and a south bridge, for example. Additionally, in some implementations, some or all of the functionality of the I/O interface 710, such as an interface to the non-transitory computer readable storage medium 720, may be incorporated directly into the processor(s) 702.

The propulsion controller 704 communicates with the navigation system 708 (e.g., for adjusting the power of each propeller motor of the UAV 400 of FIG. 4 to guide the UAV along a determined travel path). The navigation system 708 may include a global positioning system (GPS), indoor positioning system (IPS), or other similar system and/or sensors that can be used to navigate the UAV 400 to and/or from a location (e.g., for landing on a transportation vehicle). The item engagement mechanism controller 712 communicates with the motor(s) (e.g., a servo motor) used to engage and/or disengage items. For example, when the UAV is positioned over a level surface at a delivery location, the item engagement mechanism controller 712 may provide an instruction to a motor that controls the item engagement mechanism to release an item.

The network interface 716 may be configured to allow data to be exchanged between the UAV control system 410, other devices attached to a network, such as other computer systems (e.g., remote computing resources 210), and/or with UAV control systems of other UAVs. For example, the network interface 716 may enable wireless communication between the UAV 400 and the UAV management system 226 that is implemented on one or more of the remote computing resources 210. For wireless communication, an antenna of a UAV or other communication components may be utilized. As another example, the network interface 716 may enable wireless communication between numerous UAVs. In various implementations, the network interface 716 may support communication via wireless general data networks, such as a Wi-Fi network. For example, the network interface 716 may support communication via telecommunications networks such as cellular communication networks, satellite networks, and the like.

In some implementations, input/output devices 718 may include one or more displays, imaging devices, thermal sensors, infrared sensors, time of flight sensors, accelerometers, pressure sensors, weather sensors, etc. Multiple input/output devices 718 may be present and controlled by the UAV control system 410. One or more of these sensors may be utilized to assist in the landing as well as the avoidance of obstacles during flight. For example, an imaging sensor may be utilized to assist with a landing of a UAV on a transportation vehicle and/or for determining an identification of the transportation vehicle.

As shown in FIG. 7, the memory may include program instructions 722 that may be configured to implement the example processes and/or sub-processes described herein. The data storage 724 may include various data stores for maintaining data items that may be provided for determining travel paths, receiving items, landing, identifying locations for engaging or disengaging items, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 410 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV control system 410 may also be connected to other devices that are not illustrated, or instead may operate as a standalone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 410. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the UAV control system 410 may be transmitted to the UAV control system 410 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

While the functional components of the example UAV 400 are discussed herein as part of the UAV 400, in other implementations, one or more of the functional components may be distributed and/or implemented as part of the UAV management system 226. For example, one or more of the aspects of the program instructions 722 may be implemented as part of the UAV management system 226.

Figure 8:
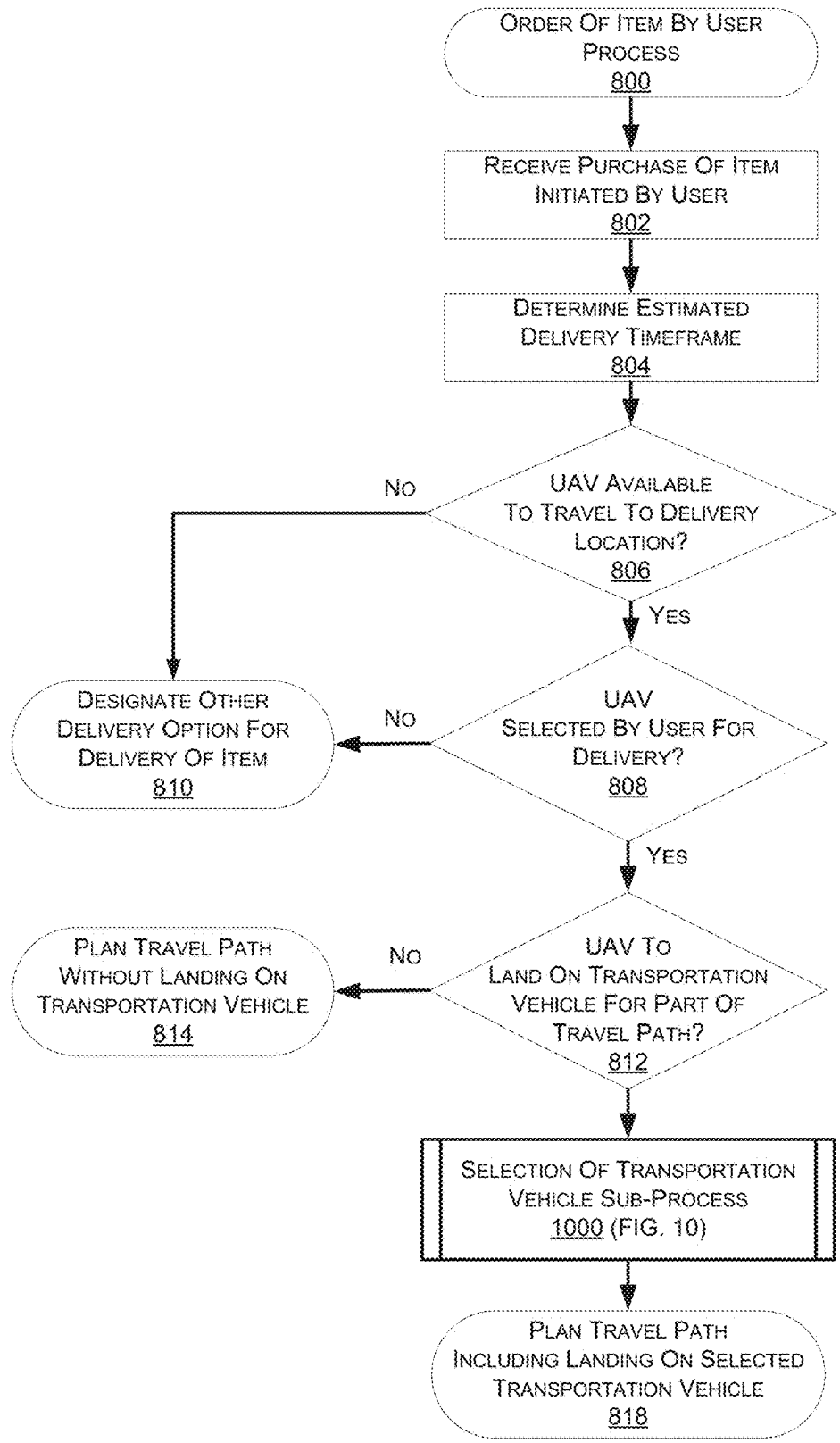
FIG. 8 is a flow diagram illustrating an example process for processing a user order for an item, according to some implementations.

FIG. 8 is a flow diagram illustrating an example process 800 for processing a user order for an item. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 800 begins with the receipt of a purchase request initiated by a user, as in 802. Upon receiving a purchase request for an item from a user, a determination is made as to the estimated delivery timeframe for that item, as in 804. In some examples, this may include identifying a materials handling facility with the requested item in stock and estimating the time required to fulfill the item to the user. In other implementations, the estimated delivery timeframe may be a set day from the date of the purchase request or a series of days. For example, a user may specify that the delivery timeframe is to be one day from the date of the purchase request or between three and five days from the date of the purchase request. In still other implementations, the estimated delivery timeframe may be a set day of the week upon which the user has requested to have items delivered. For example, a user may preselect to have items ordered during the week delivered on Thursday of every week.

After the estimated delivery timeframe is determined, a determination is made as to whether a UAV is available to travel and make the delivery to the user specified delivery location, as in 806. If it is determined that a UAV is available to make the delivery, a determination is made as to whether the UAV is selected by the user for the delivery, as in 808. In various implementations, an interaction may be received from a user through a user interface that presents delivery options to the user and receives a selection from the user (e.g., for selecting delivery by a UAV or other delivery option). In addition, in various implementations a user may preselect or provide a preference for deliveries by UAVs or other delivery options. If a UAV is not selected by the user for the delivery, as in 808, or if no UAV is available, as in 806, another delivery option is designated for the delivery of the item, as in 810.

If a UAV is selected by the user for the delivery, a determination is made as to whether the UAV is to land on a transportation vehicle for part of the travel path, as in 812. If the UAV is not to land on a transportation vehicle, the travel path is planned without including such a landing, as in 814. For example, a travel path may include the UAV flying for the entire distance to the delivery location for delivering the item to the user. If the UAV is to land on a transportation vehicle, a transportation vehicle selection sub-process is performed, as in 1000, as will be described in more detail below with respect to FIG. 10. Once a transportation vehicle has been selected, the travel path is planned including landing on the selected transportation vehicle, as in 818.

It will be appreciated that the planning of a travel path including a landing on a transportation vehicle may be performed before the UAV departs with the item from a materials handling facility, or may be performed while a flight is in progress, as will be described in more detail below with respect to FIG. 9. As part of the planning of a travel path, a departure time of the UAV (e.g., from a materials handling facility) may be chosen to coincide with the timing of a route of a particular transportation vehicle, so that the UAV may advantageously land on the transportation vehicle and be transported closer to the delivery location for a portion of the known route. As part of the planning of the travel path, an estimation may also be made as to a departure location where the UAV will take off from the transportation vehicle, and fly toward a travel destination (e.g., the delivery location). In various implementations, the planning of the travel path may also include a return of the UAV (e.g., back to a materials handling facility that the UAV originated from).

Figure 9:
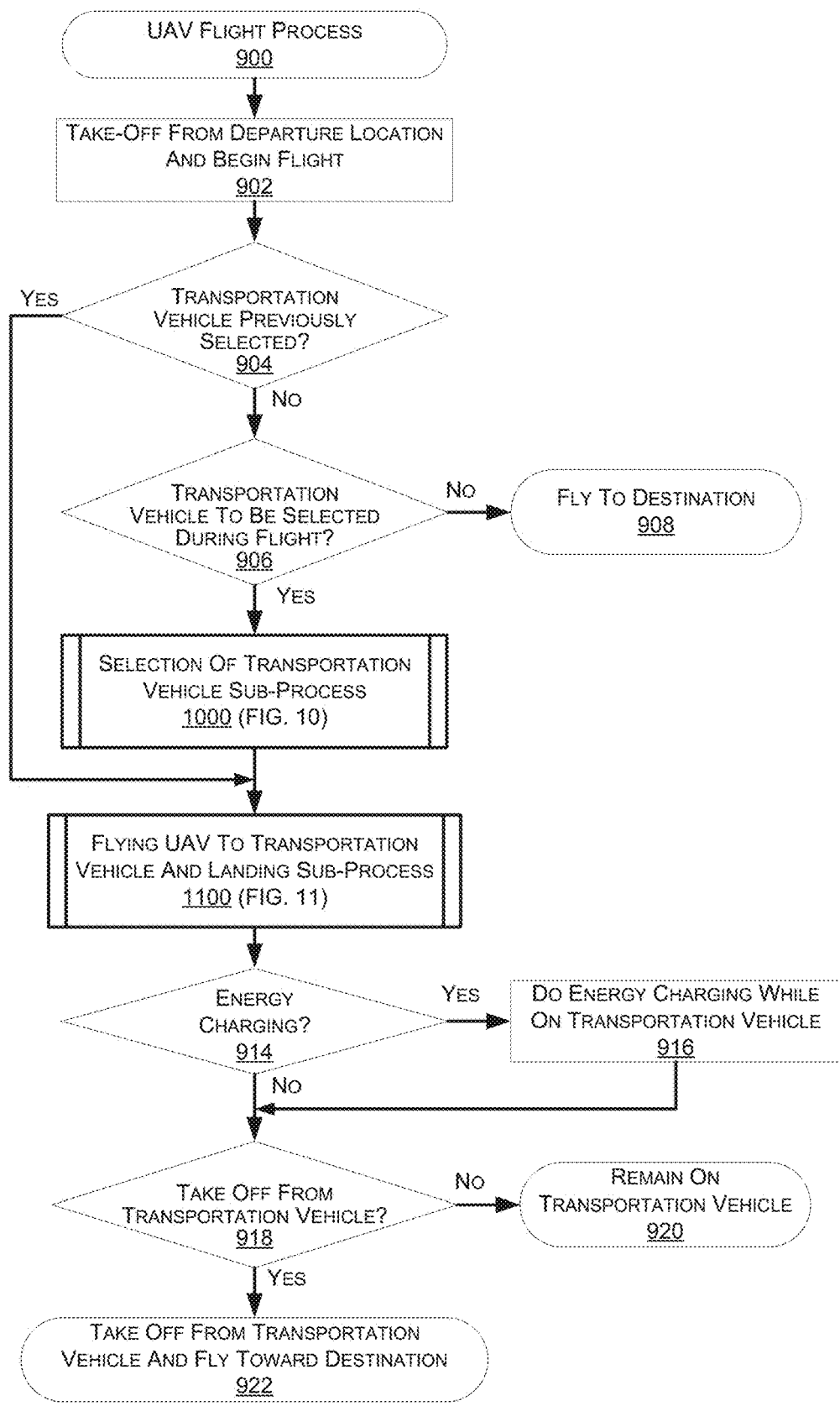
FIG. 9 is a flow diagram illustrating an example process for flying an unmanned aerial vehicle, according to some implementations.

FIG. 9 is a flow diagram illustrating an example process 900 for flying a UAV, according to some implementations. The example process begins with sending instructions to the UAV to take off from the departure location and begin a flight toward a destination, as in 902. During the flight, a determination is made as to whether a transportation vehicle has previously been selected, as in 904. For example, as described above with respect to FIG. 8, a transportation vehicle may be selected in advance.

If a transportation vehicle has not previously been selected, a determination is made as to whether a transportation vehicle is to be selected during the flight, as in 906. If no transportation vehicle is to be selected, the UAV continues flying to a destination, as in 908. If a transportation vehicle is to be selected during the flight, a transportation vehicle selection sub-process is performed, as in 1000, as will be described in more detail below with respect to FIG. 10. Once a transportation vehicle has been selected, as in 1000, or if a transportation vehicle was previously selected, as in 904, a flying and landing of the transportation vehicle sub-process is performed as in 1100, as will be described in more detail below with respect to FIG. 11.

Once the UAV has landed on the transportation vehicle, a determination is made as to whether energy charging will be performed, as in 914. If energy charging is to be performed, the energy charging is done while the UAV rests on the transportation vehicle, as in 916. For example, one or more propellers of the UAV may be utilized for generating electricity, as described above with respect to FIG. 6. As another example, the transportation vehicle may include charging capabilities (e.g., a charging port, an inductive charging component, etc.) which may be utilized for charging a power module of the UAV.

While the energy charging is occurring, as in 916, or if no energy charging is to be performed as in 914, a determination is made as to whether a location has been reached where the UAV is to take off from the transportation vehicle, as in 918. If the UAV is not to take off from the transportation vehicle, the UAV remains on the transportation vehicle, as in 920. In various implementations, the UAV may remain on the transportation vehicle for a variety of reasons. For example, the UAV may have developed mechanical issues, may not have a sufficient energy level in its power modules for taking off and completing a next portion of its travel path, etc. If the UAV is to take off from the transportation vehicle, the UAV takes off and flies toward a destination, as in 922.

Figure 10:
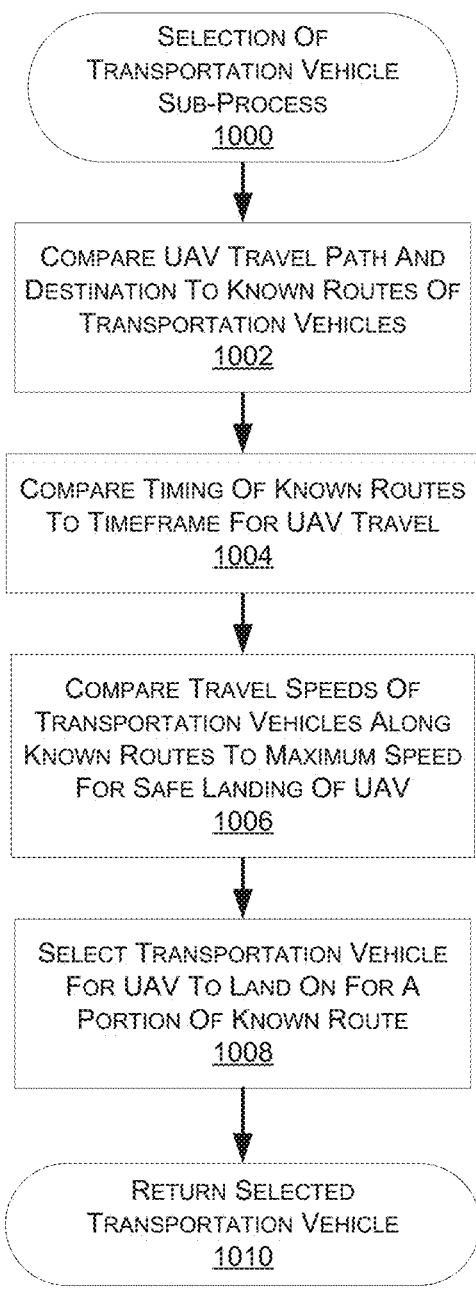
FIG. 10 is a flow diagram illustrating an example subprocess for selecting a transportation vehicle on which an unmanned aerial vehicle will land, according to some implementations.

FIG. 10 is a flow diagram illustrating an example sub-process 1000 for selecting a transportation vehicle, according to some implementations. The example sub-process begins with comparing an initial UAV travel path and destination to known routes of available transportation vehicles, as in 1002. In various implementations, one factor that may be considered is whether landing on a given transportation vehicle will result in a net energy savings for the UAV. For example, if a UAV must fly too far out of its way to reach a transportation vehicle, the UAV may expend more energy than it will save by landing and being transported by the transportation vehicle.

Once the UAV travel path and destination have been compared to the known routes, the timing of the known routes is compared to a timeframe for the UAV travel, as in 1004. In various implementations, the travel path of the UAV may be associated with a specific timeframe, (e.g., as related to a delivery deadline). In such circumstances, if the known route has too many delays, it may cause the UAV to miss the delivery deadline, and therefore would not be an appropriate selection.

Once the timing of the known routes has been compared to the timeframe for the UAV travel, the travel speeds of the transportation vehicles along the known routes is compared to a maximum speed for a safe landing of a UAV, as in 1006. For example, a UAV may have a maximum flying speed, and if a transportation vehicle will be traveling along a portion of a route (e.g., a freeway) where the travel speed exceeds the maximum flying speed of the UAV, the UAV will not be able to keep up with and correspondingly land on transportation vehicle. As another example, even if the UAV is able to fly fast enough to keep up with the transportation vehicle, certain speeds may be determined to be too fast (e.g., due to wind shear, turbulence, potential speed variations, etc.) to be within a desired margin of safety for a landing.

Once the travel speeds have been compared to the maximum speed for a safe landing, a transportation vehicle is selected for the UAV to land on, as in 1008. In various implementations, some or all of the previously described factors may be assigned weighted values and may be included in an optimization calculation. For example, factors such as energy savings, timing, safety, etc. may all be considered as part of an evaluation for selecting a transportation vehicle. Once a transportation vehicle has been selected, the selected transportation vehicle is returned, as in 1010.

Figure 11:
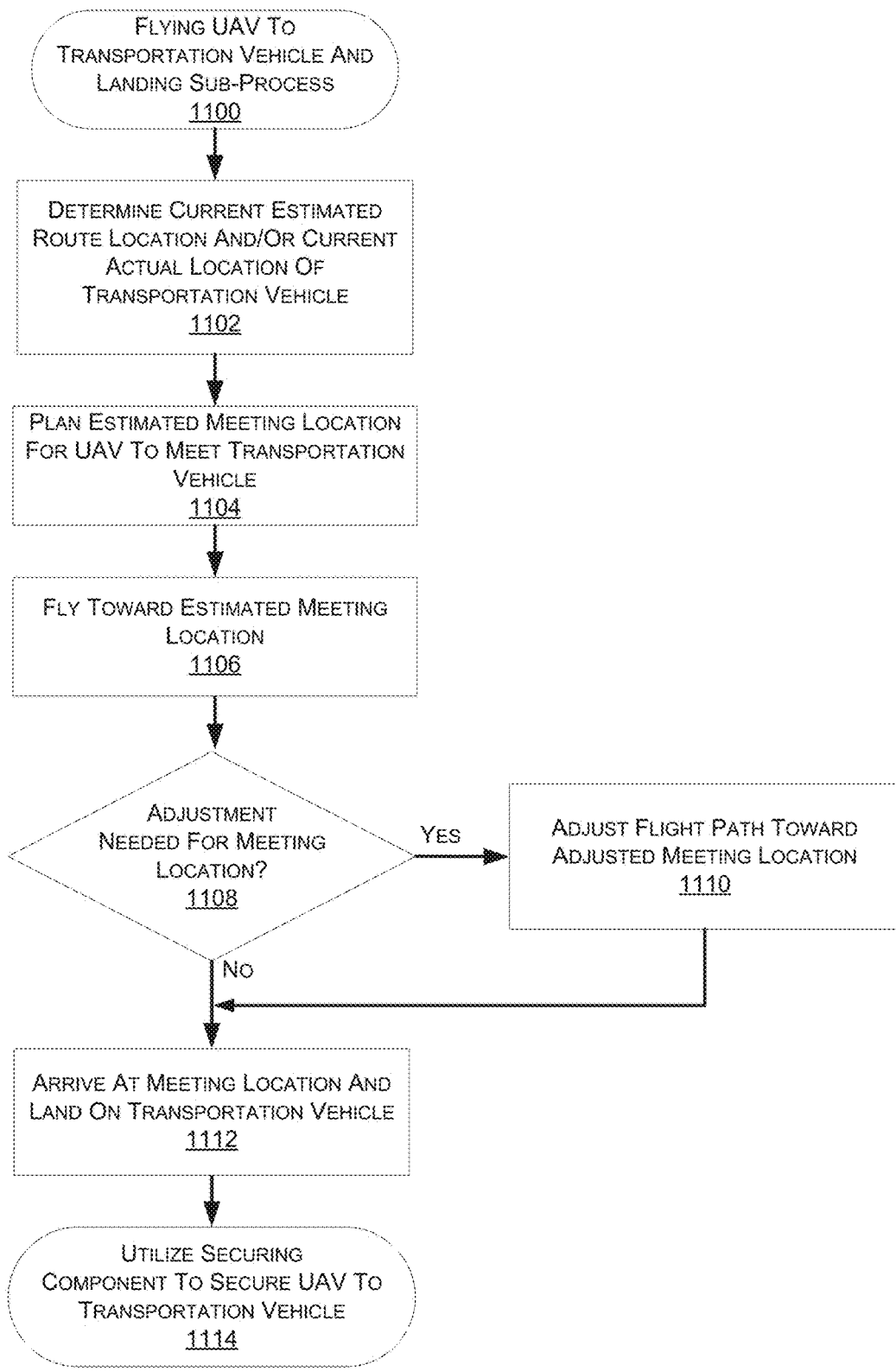
FIG. 11 is a flow diagram illustrating an example subprocess for landing an unmanned aerial vehicle on a selected transportation vehicle, according to some implementations.

FIG. 11 is a flow diagram illustrating an example sub-process 1100 for landing a UAV on a transportation vehicle, according to some implementations. The example sub-process begins with a determination of a current estimated route location and/or a current actual location of a transportation vehicle, as in 1102. For example, GPS data may be utilized to determine a current actual location, travel speed, direction, etc. of a transportation vehicle. Once the current estimated or actual location of the transportation vehicle is determined, an estimated meeting location where the UAV will meet the transportation vehicle is planned, as in 1104. Factors for determining the estimated meeting location may include the flying speed of the UAV, the travel speed and direction of the transportation vehicle, upcoming changes in the known route of the transportation vehicle, etc.

Once the estimated meeting location has been planned, the UAV is instructed to fly toward the estimated meeting location, as in 1106. As the UAV is flying toward the estimated meeting location, a determination is made as to whether an adjustment is needed for the meeting location, as in 1108. For example, if the actual travel speed or route of the transportation vehicle and/or UAV is different than was expected, an adjustment to the meeting location may be required. If an adjustment is needed for the meeting location, the flight path is adjusted toward the adjusted meeting location, as in 1110.

Once the flight path has been adjusted, as in 1110, or if the meeting location does not require adjustment, as in 1108, the UAV arrives at the meeting location and lands on the transportation vehicle, as in 1112. Once the UAV lands on the transportation vehicle, a securing component may be utilized to secure the UAV to the transportation vehicle, as in 1114. In various implementations, securing components may be included on the UAV, the transportation vehicle, or both. As an example, a hooking component may be included on either the UAV or transportation vehicle, or both, for securing the UAV to the transportation vehicle. As another example, the UAV may include an electromagnetic securing component for securing to a roof or other surface of the transportation vehicle.

Figure 12:
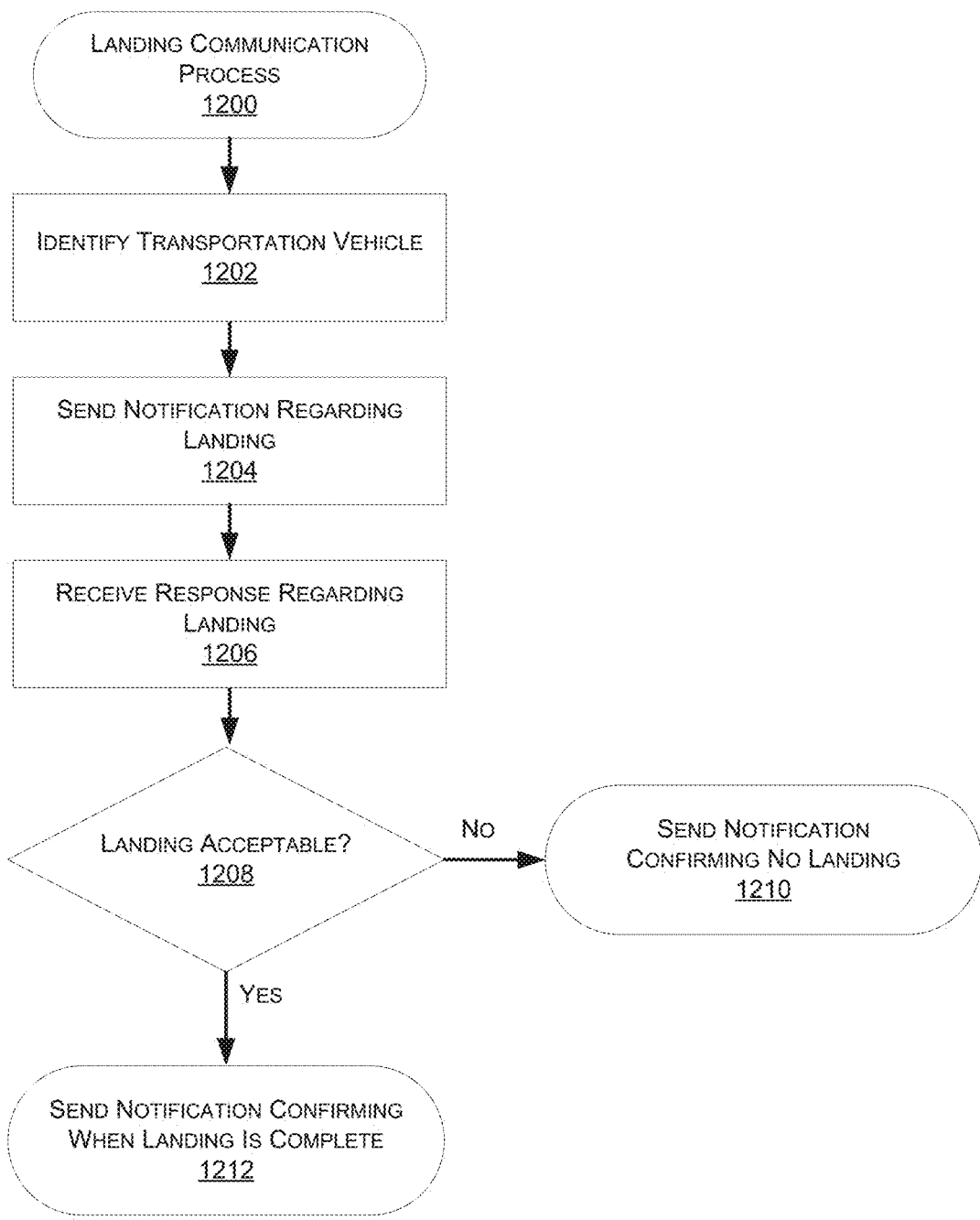
FIG. 12 is a flow diagram illustrating an example process for communications during a landing of an unmanned aerial vehicle, according to some implementations.

FIG. 12 is a flow diagram illustrating an example process 1200 for communications during a landing of a UAV on a transportation vehicle, according to some implementations. The example process begins with an identification of a transportation vehicle, as in 1202. In various implementations, the particular transportation vehicle may be identified in accordance with a visual identifier or other identification technique. For example, the transportation vehicle may include identifying markers on a roof or other surface, such as painted numbers, a barcode, a QR code, etc. that may be imaged or scanned by a flying UAV, or may transmit a coded sequence, or may otherwise be identified by GPS location, etc.

Once a transportation vehicle has been identified for a landing, a notification is sent regarding the landing, as in 1204. In various implementations, the notification may be sent from the UAV 400 or UAV management system 226 to the transportation vehicle and/or a management system of the transportation vehicle. In various implementations, the notification may include various types of information regarding the proposed landing. For example, the notification may include an estimated arrival time and/or an estimated meeting location where the UAV will land on the transportation vehicle. As another example, the notification may include a request for confirmation that a landing is acceptable. As another example, the notification may include information for a driver of the transportation vehicle, indicating that a landing is about to occur, and may include requests such as to maintain a current speed or heading, or to remain parked while the landing occurs, etc.

After the notification regarding the landing is sent, a response regarding the landing is received, as in 1206. In various implementations, the response may include different types of information regarding the proposed landing. For example, the response may include an indication as to whether or not the proposed landing is acceptable. Once the response regarding the landing has been received, a determination is made as to whether the landing is acceptable, as in 1208. For example, the transportation vehicle may already have a scheduled landing planned at a short time later by another UAV, may already have another UAV on the roof, or may not currently be following a scheduled route, for which a landing may not be acceptable. If a landing is not acceptable, a reply notification is sent confirming that no landing will be attempted, as in 1210. If a landing is acceptable, a notification is sent confirming when the landing is complete, as in 1212.

In various implementations, part or all of the example process 1200 may be performed when a UAV arrives at a planned meeting location (e.g., as described above with respect to FIG. 11), or alternatively may be performed when a UAV identifies a transportation vehicle as the UAV flies along a travel path. For example, a UAV that is flying along a travel path toward a travel destination may continually scan for transportation vehicles that are travelling below and may identify transportation vehicles based on visual identifiers or other identification techniques. If an identified transportation vehicle is determined (e.g., as observed with an imaging sensor on the UAV) to be heading in the same direction as the UAV, the UAV may land on the transportation vehicle for transport for as long as the transportation vehicle appears to be continuing to carry the UAV closer to the travel destination of the UAV (e.g., as determined by GPS tracking of the UAV, etc.). Once the transportation vehicle does not appear to be carrying the UAV any closer to the travel destination of the UAV, the UAV may take off from the transportation vehicle and continue flying toward the travel destination.

Figure 13:
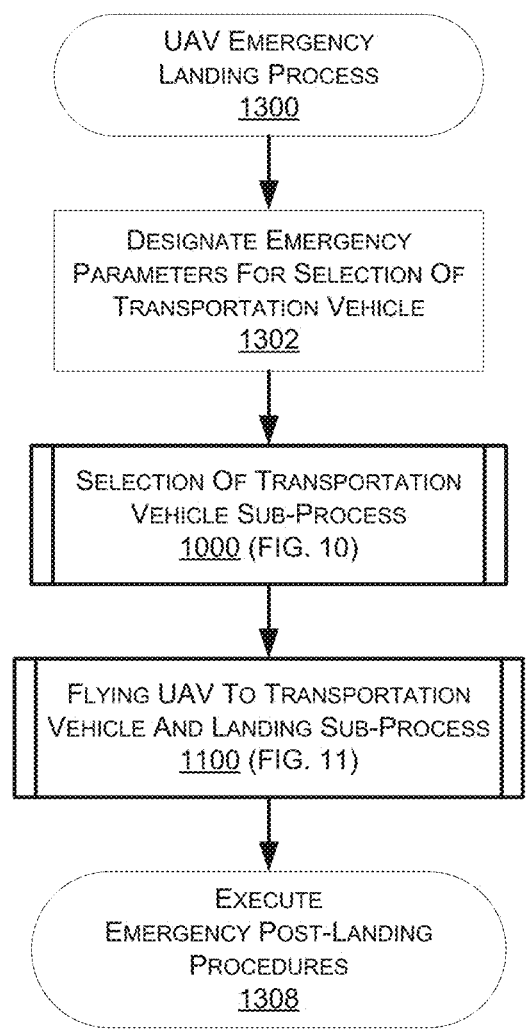
FIG. 13 is a flow diagram illustrating an example process for an emergency landing of an unmanned aerial vehicle on a transportation vehicle, according to some implementations.

FIG. 13 is a flow diagram illustrating an example process 1300 for an emergency landing on a transportation vehicle, according to some implementations. The example process begins with designating emergency parameters for a selection of a transportation vehicle, as in 1302. In various implementations, the emergency parameters may adjust or eliminate certain factors with regard to the selection of the transportation vehicle. For example, in a situation where the UAV has a limited ability to fly for an extended period of time (e.g., due to mechanical issues, low energy level of power module, etc.) the emergency parameters may indicate that a nearby transportation vehicle should be selected relatively quickly. In such instances, a transportation vehicle that would otherwise not be selected due to not providing any energy savings (e.g., heading in an opposite direction of a travel destination for the UAV), may be selected. Once the emergency parameters have been designated, the transportation vehicle selection sub-process is performed, as in 1000, as described above with respect to FIG. 10.

Once the transportation vehicle has been selected, the flying and landing of the UAV sub-process is performed, as in 1100, as described above with respect to FIG. 11. Once the UAV has been landed on the transportation vehicle, emergency post-landing procedures are executed, as in 1308. In various implementations, the emergency post-landing procedures may include communications or activities for the removal and return of the UAV. For example, a message may be sent to a management system for the transportation vehicle, indicating that an emergency landing has been performed, and outlining steps for the return of the UAV. In some instances, an agent may be dispatched to meet the transportation vehicle at a designated location for retrieving the UAV. In other instances, instructions may be sent for shipping the UAV back in a box, or dropping the UAV off at a designated location, etc.

Figure 14:
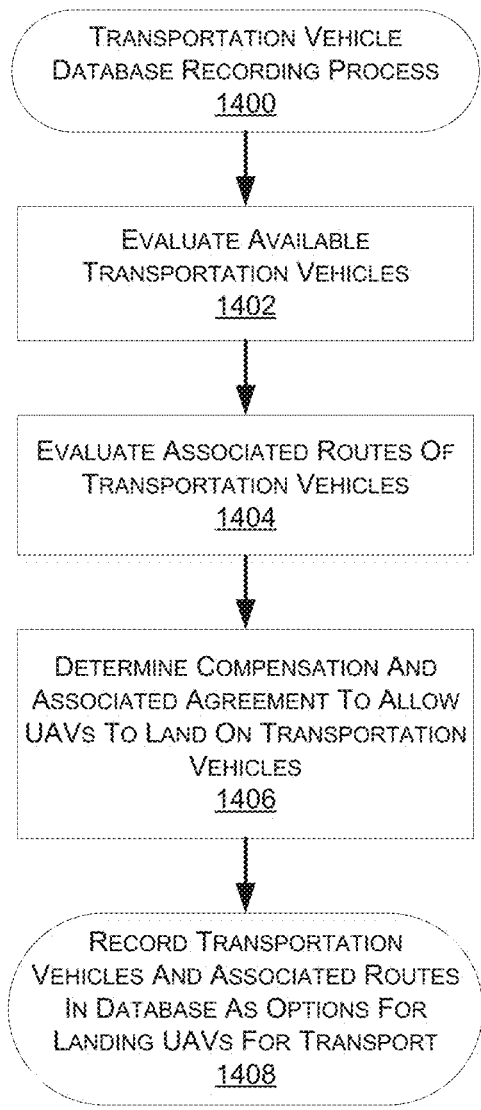
FIG. 14 is a flow diagram illustrating an example process for recording available transportation vehicles and associated routes in a database, according to some implementations.

FIG. 14 is a flow diagram illustrating an example process 1400 for recording available transportation vehicles and associated routes in a database, according to some implementations. The example process begins with evaluating one or more available transportation vehicles (e.g., of a shipping carrier, of public transportation company, etc.). In various implementations, different types of vehicles may have specific characteristics that may be more or less suitable with regard to the landing of UAVs. For example, certain transportation vehicles may have a larger amount of space on the roof or other surface, which may be preferable for the landing of UAVs.

Once the available transportation vehicles have been evaluated, an evaluation is also performed of the associated routes of the transportation vehicles. The associated travel ranges and timing of the routes may be important for determining when and how often the associated transportation vehicles may be selected for landings and transport of UAVs. Once the associated routes have been evaluated, a determination may be made of the compensation and associated agreement for allowing UAVs to land on the transportation vehicles, as in 1406. In various implementations, the agreement may include terms of compensation for each time a landing is performed, and/or may cover an overall agreement for the use of the transportation vehicles for landings. For example, a fixed or recurring fee may be paid to allow for landing of UAVs on transportation vehicles of a shipping carrier. The agreement may be made between a first entity (e.g., a company or other entity that owns the UAVs) and a second entity (e.g., a shipping carrier, a public transportation company, etc.) that owns the transportation vehicles. Once the agreement has been made, the transportation vehicles and associated routes are recorded in the database as options for the landing of UAVs for transport, as in 1408.

Figure 15:
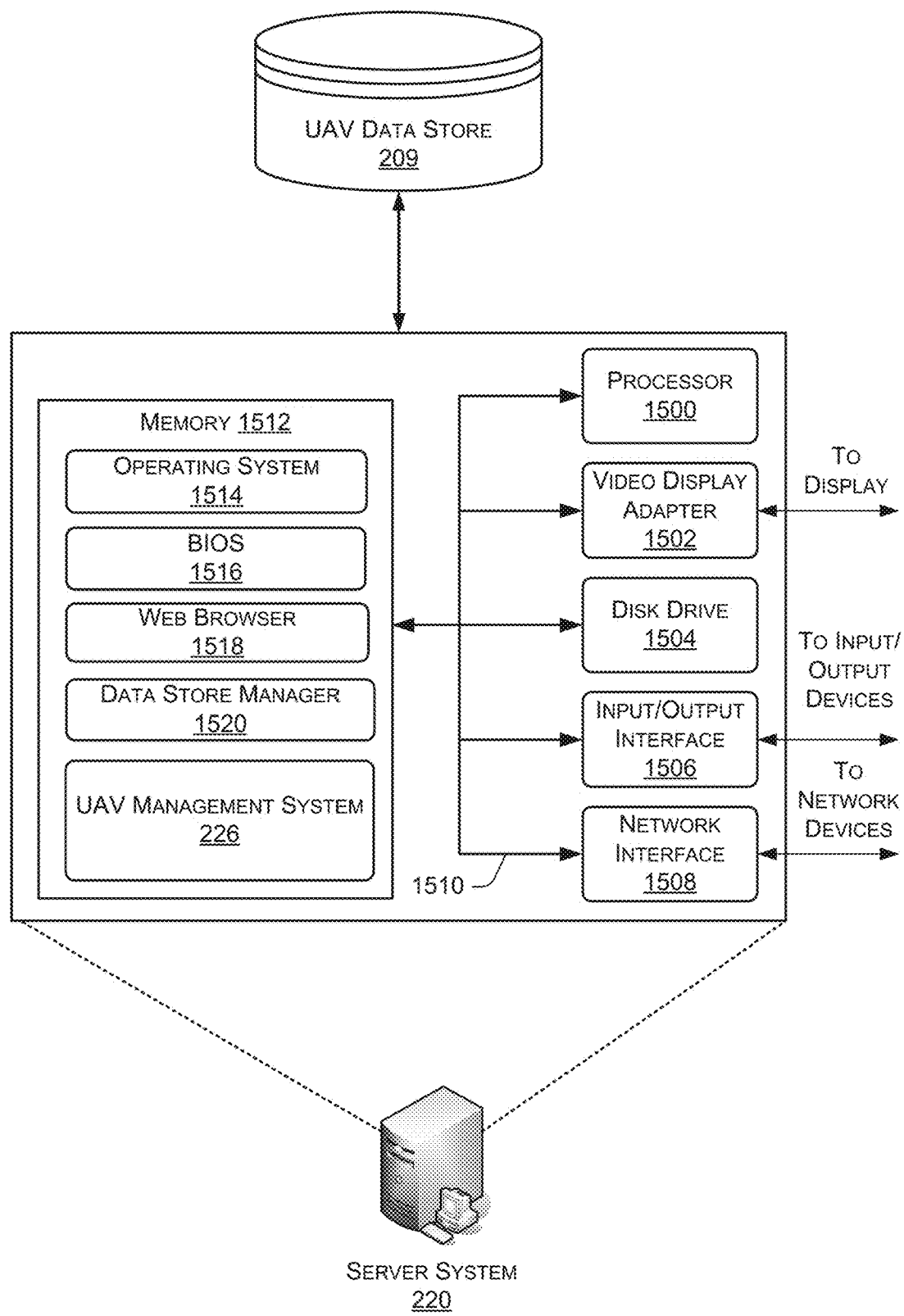
FIG. 15 is a block diagram of an illustrative implementation of a server system that may be used with various implementations.

FIG. 15 is a pictorial diagram of an illustrative implementation of a server system, such as the server system 220, which may be used in the implementations described herein. The server system 220 may include a processor 1500, such as one or more redundant processors, a video display adapter 1502, a disk drive 1504, an input/output interface 1506, a network interface 1508, and a memory 1512. The processor 1500, the video display adapter 1502, the disk drive 1504, the input/output interface 1506, the network interface 1508, and the memory 1512 may be communicatively coupled to each other by a communication bus 1510.

The video display adapter 1502 provides display signals to a local display (not shown in FIG. 15) permitting an agent of the server system 220 to monitor and configure operation of the server system 220 and/or to provide information (e.g., regarding a landing of a UAV 400 on a transportation vehicle 201, etc.). The input/output interface 1506 likewise communicates with external input/output devices not shown in FIG. 15, such as a mouse, keyboard, scanner, or other input and output devices that can be operated by an agent of the server system 220. The network interface 1508 includes hardware, software, or any combination thereof, to communicate with other computing devices. For example, the network interface 1508 may be configured to provide communications between the server system 220 and other computing devices, such as that of a UAV 400, UAV management system 226, transportation vehicle 201 and/or transportation vehicle management system, etc., via a network.

The memory 1512 generally comprises random access memory (RAM), read-only memory (ROM), flash memory, and/or other volatile or permanent memory. The memory 1512 is shown storing an operating system 1515 for controlling the operation of the server system 220. A binary input/output system (BIOS) 1516 for controlling the low-level operation of the server system 220 is also stored in the memory 1512.

The memory 1512 additionally stores program code and data for providing network services to the UAV 400, UAV management system 226, transportation vehicle 201 and/or transportation vehicle management system. Accordingly, the memory 1512 may store a browser application 1518. The browser application 1518 comprises computer executable instructions, that, when executed by the processor 1500 generate or otherwise obtain configurable markup documents such as Web pages. The browser application 1518 communicates with a data store manager application 1520 to facilitate data exchange between the data store 209 and the UAV management system 226.

As used herein, the term "data store" refers to any device or combination of devices capable of storing, accessing, and retrieving data, which may include any combination and number of data servers, databases, data storage devices and data storage media, in any standard, distributed or clustered environment. The server system 220 can include any appropriate hardware and software for integrating with the data store 209 as needed to execute aspects of one or more applications for a UAV 400, UAV management system 226, transportation vehicle 201, and/or transportation vehicle management system.

The data store 209 can include several separate data tables, databases or other data storage mechanisms and media for storing data relating to a particular aspect. For example, the illustrated data store 209 includes mechanisms for maintaining information related to operations, inventory, maps, GPS data, transportation vehicles and associated routes, etc., which can be used to generate and deliver information to a UAV 400, UAV management system 226, transportation vehicle 201, transportation vehicle management system, and/or agents. It should be understood that there may be additional aspects that can be stored in the data store 209 and that additional data stores beyond the one illustrated may be included. The data store 209 is operable, through logic associated therewith, to receive instructions from the server system 220 and obtain, update or otherwise process data in response thereto.

The memory 1512 may also include the UAV management system 226, discussed above. The UAV management system 226 may be executable by the processor 1500 to implement one or more of the functions of the server system 220. In one implementation, the UAV management system 226 may represent instructions embodied in one or more software programs stored in the memory 1512. In another implementation, the UAV management system 226 can represent hardware, software instructions, or a combination thereof.

The server system 220, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction in FIG. 15 should be taken as being illustrative in nature and not limiting to the scope of the disclosure.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer implemented method comprising:
under control of one or more computing systems configured with executable instructions and that are configured to wirelessly communicate with first and second unmanned aerial vehicles ("UAV") located at a materials handling facility with first and second items to be delivered by the first and second UAVs to first and second travel destinations, respectively:
evaluating a route for each of a plurality of transportation vehicles relative to each respective travel destination of each respective UAV of the first and second UAVs, wherein the plurality of transportation vehicles includes at least a first transportation vehicle and a second transportation vehicle;
selecting the first transportation vehicle for the first UAV to land on to bring the first UAV closer in distance to the first travel destination of the first UAV based at least in part on the evaluation of the route of the first transportation vehicle;
selecting the second transportation vehicle for the second UAV to land on to bring the second UAV closer in distance to the second travel destination of the second UAV based at least in part on the evaluation of the route of the second transportation vehicle;
selecting a first meeting location that the fir UAV will fly to and where the fir UAV will land on the first transportation vehicle for transport during a first portion of the route of the first transportation vehicle to bring the first UAV closer in distance to the travel destination of the first UAV;
selecting a second meeting location that the second UAV will fly to and where the second UAV will land on the second transportation vehicle for transport during a second portion of the route of the second transportation vehicle to bring the second UAV closer in distance to the travel destination of the second UAV;
sending instructions to the first UAV to fly to the first meeting location and to land on the first transportation vehicle for transport during the first portion of the route of the first transportation vehicle; and
sending instructions to the second UAV to fly to the second meeting location and to land on the second transportation vehicle for transport during the second portion of the route of the second transportation vehicle.

2. The computer implemented method of claim 1, further comprising:
sending a first notification regarding a first proposed landing of the first UAV on the first transportation vehicle;
sending a second notification regarding a second proposed landing of the second UAV on the second transportation vehicle;
receiving a first response regarding the first proposed landing which indicates that the first proposed landing is acceptable; and
receiving a second response regarding the second proposed landing which indicates that the second Proposed landing is acceptable.

3. The computer implemented method of claim 2, wherein the first and second notifications regarding the first and second proposed landings include a first indication of a first estimated meeting location and a second indication of a second estimated meeting location, wherein the first estimated meeting location is selected as the first meeting location that the first UAV will fly to and the second estimated meeting location is selected as the second meeting location that the second UAV will fly to.

4. The computer implemented method of claim 3, wherein each respective notification regarding each respective proposed landing further includes an estimated arrival time of when each respective UAV will arrive at each respective estimated meeting location.

5. The computer implemented method of claim 2, wherein:
the first notification regarding the first proposed landing indicates that the first transportation vehicle should maintain at least one of a first current position, a first speed, or a first heading while the first landing occurs; and
wherein the second notification regarding the second proposed landing indicates that the second transportation vehicle should maintain at least one of a second current position, a second speed, or a second heading while the second landing occurs.

6. The computer implemented method of claim 2, wherein prior to selecting the first transportation vehicle for the first UAV to land on and the second transportation vehicle for the second UAV to land on, the method further comprises:
sending a different notification regarding a different proposed landing of at least one of the first and second UAVs on a different transportation vehicle other than the first transportation vehicle or the second transportation vehicle, respectively; and
receiving a different response regarding the different proposed landing on the different transportation vehicle which indicates that the different proposed landing on the different transportation vehicle is not acceptable.

7. The computer implemented method of claim 6, wherein the different response indicates that the different proposed landing on the different transportation vehicle is not acceptable due to at least one of another UAV other than the first UAV or the second UAV already having been scheduled to land on the different transportation vehicle or the another UAV other than the first UAV or the second UAV already having landed on the different transportation vehicle.

8. The computer implemented method of claim 1, wherein the plurality of transportation vehicles further includes at least a third transportation vehicle and the method further comprises not selecting the third transportation vehicle for one or both of the first and second UAVs to land on based at least in part on the evaluation of the route of the third transportation vehicle.

9. A system, comprising:
first and second unmanned aerial vehicles ("UAVs"), each UAV including:
a propulsion system;
a power module connected to the propulsion system and which provides energy to the propulsion system to fly the UAV; and
an antenna;
a materials handling facility with first and second items to be delivered by the first and second UAVs to first and second delivery locations, respectively; and
a computing system configured to wirelessly communicate with the first and second UAVs using the antennas of the first and second UAVs, the computing system including:
one or more processors; and
a memory coupled to the one or more processors and storing program instructions that when executed by the one or more processors cause the one or more processors to at least:
identify a plurality of transportation vehicles that the first UAV may land on for transport as part of a travel path of the first UAV from the materials handling facility to the first delivery location;
select a first transportation vehicle from the plurality of transportation vehicles for the first UAV to land on to bring the first UAV closer in distance to the first delivery location which is a travel destination of the first UAV;
determine a meeting location that the first UAV will fly to and where the first UAV will land on the first transportation vehicle;
transmit instructions to the first UAV to fly with the first item from the materials handling facility to the meeting location and to land on the first transportation vehicle for transport during a first portion of a first known route of the first transportation vehicle that will bring the first UAV closer in distance to the first delivery location; and
transmit instructions to the second UAV to fly with the second item from the materials handling facility to a second meeting location and to land on a second transportation vehicle for transport during a second portion of a second known route of the second transportation vehicle that will bring the second UAV closer in distance to the second delivery location.

10. The system of claim 9, wherein the program instructions when executed by the one or more processors further cause the one or more processors to determine a first travel direction of the first transportation vehicle and wherein the first transportation vehicle is selected for the first UAV to land on based at least in part on the first travel direction of the first transportation vehicle.

11. The system of claim 9, wherein the program instructions when executed by the one or more processors further cause the one or more processors to:
determine a different travel direction of a different transportation vehicle of the plurality of transportation vehicles other than the first transportation vehicle; and
not select the different transportation vehicle for the first UAV to land on based at least in part on the different travel direction of the different transportation vehicle.

12. The system of claim 9, wherein after the first UAV has landed on the first transportation vehicle, the program instructions when executed by the one or more processors further cause the one or more processors to determine if the first transportation vehicle is continuing to transport the fir UAV closer in distance to the first delivery location.

13. The system of claim 12, wherein the program instructions when executed by the one or more processors further cause the one or more processors to, based at least in part on a determination that the first transportation vehicle is no longer transporting the first UAV closer in distance to the first delivery location, control the propulsion system of the first UAV to take off from the first transportation vehicle and to continue to fly toward the first delivery location.

14. The system of claim 9, wherein the program instructions when executed by the one or more processors further cause the one or more processors to:
send a notification regarding a proposed landing of the first UAV on the first transportation vehicle;
receive a response regarding the proposed landing; and
based at least in part on the response, determine that the first UAV is to land on the first transportation vehicle.

15. The system of claim 14, wherein the program instructions when executed by the one or more processors further cause the one or more processors to receive a notification from the first UAV confirming that a landing of the first UAV on the first transportation vehicle is complete.

16. The system of claim 14, wherein the notification regarding the proposed landing of the first UAV is sent to at least one of the first transportation vehicle or a management system of the first transportation vehicle.

17. The system of claim 9, wherein the first UAV further includes a sensor, and the sensor is utilized to identify the first transportation vehicle before the first UAV lands on the first transportation vehicle by at least one of imaging or scanning an identifier on the first transportation vehicle.

18. The system of claim 9, wherein the program instructions when executed by the one or more processors further cause the one or more processors to receive a notification from the first UAV confirming that the first UAV has taken off from the first transportation vehicle to continue to fly toward the first delivery location.

19. The system of claim 9, wherein the program instructions when executed by the one or more processors further cause the one or more processors to receive a notification from the first UAV confirming that the first UAV has delivered the first item to the first delivery location.

20. A computer implemented method, comprising:
under control of one or more remote computing resources configured with executable instructions, determining a plurality of transportation vehicles that first and second unmanned aerial vehicles ("UAVs") may land on for transport as part of each travel path of each UAV from a materials handling facility with first and second items to be delivered by the first and second UAVs to first and second travel destinations, respectively;
evaluating a known route for each of the plurality of transportation vehicles;
selecting a first transportation vehicle from the plurality of transportation vehicles for the first UAV to land on to bring the first UAV closer in distance to the first travel destination of the first UAV while carrying the first item based at least in part on each evaluation;
selecting a second transportation vehicle from the plurality of transportation vehicles for the second UAV to land on to bring the second UAV closer in distance to the second travel destination of the second UAV while carrying the second item based at least in part on each evaluation;

transmitting first instructions to the first UAV to land on the first transportation vehicle for transport during a first portion of the known route of the first transportation vehicle; and transmitting second instructions to the second UAV to land on the second transportation vehicle for transport during a second portion of the known route of the second transportation vehicle.

21. The computer implemented method of claim 20, wherein the first and second travel destinations of the first and second UAVs are first and second delivery locations, and the method further comprises:

receiving a fir notification from the first UAV confirming that the first UAV has delivered the first item to the first delivery location; and receiving a second notification from the second UAV confirming that the second UAV has delivered the second item to the second delivery location.

* * * * *

UNITED STATES PATENT AND TRADEMARK OFFICE
CERTIFICATE OF CORRECTION

| | |
|---|---|
| PATENT NO. | : 10,822,081 B2 |
| APPLICATION NO. | : 15/785886 |
| DATED | : November 3, 2020 |
| INVENTOR(S) | : Daniel Buchmueller et al. |

It is certified that error appears in the above-identified patent and that said Letters Patent is hereby corrected as shown below:

In the Claims

Column 23
Lines 46-47, Claim 1, "selecting a first meeting location that the fir UAV will fly to and where the fir UAV will land on the first" should read as --selecting a first meeting location that the first UAV will fly to and where the first UAV will land on the first--.

Column 26
Line 5, Claim 12, "first transportation vehicle is continuing to transport the fir" should read as --first transportation vehicle is continuing to transport the first--.

Column 27
Line 16, Claim 21, "receiving a fir notification from the first UAV confirming" should read as --receiving a first notification from the first UAV confirming--.

Signed and Sealed this
Eleventh Day of April, 2023

Katherine Kelly Vidal
*Director of the United States Patent and Trademark Office*